United States Patent
Luft et al.

(10) Patent No.: US 9,008,309 B2
(45) Date of Patent: Apr. 14, 2015

(54) CIRCUIT ARRANGEMENT AND A METHOD FOR ROAMING BETWEEN A VISITED NETWORK AND A MOBILE STATION

(75) Inventors: Achim Luft, Braunschweig (DE); Martin Hans, Bad Salzdetfurth (DE)

(73) Assignee: Intel Mobile Communications GmbH, Neubiberg (DE)

( * ) Notice: Subject to any disclaimer, the term of this patent is extended or adjusted under 35 U.S.C. 154(b) by 108 days.

(21) Appl. No.: 13/539,603

(22) Filed: Jul. 2, 2012

(65) Prior Publication Data

US 2014/0003605 A1    Jan. 2, 2014

(51) Int. Cl.
*H04L 29/06*    (2006.01)

(52) U.S. Cl.
CPC ............ *H04L 63/0853* (2013.01); *H04L 63/08* (2013.01)

(58) Field of Classification Search
CPC ... H04W 12/06; H04W 12/04; H04W 84/045; H04W 12/02; H04L 63/08; H04L 63/0853
USPC .................. 713/168, 171, 169; 380/247, 270; 455/433, 436, 432.1
See application file for complete search history.

(56) References Cited

U.S. PATENT DOCUMENTS

| | | | | |
|---|---|---|---|---|
| 6,671,507 B1 * | 12/2003 | Vinck | ............................ | 455/411 |
| 2002/0044552 A1 * | 4/2002 | Vialen et al. | ................... | 370/389 |
| 2003/0031322 A1 * | 2/2003 | Beckmann et al. | ........... | 380/278 |
| 2003/0039361 A1 * | 2/2003 | Hawkes et al. | ................ | 380/278 |
| 2006/0079205 A1 * | 4/2006 | Semple et al. | ................. | 455/411 |
| 2007/0202848 A1 * | 8/2007 | Ishikawa et al. | .............. | 455/411 |
| 2009/0305671 A1 * | 12/2009 | Luft et al. | ...................... | 455/411 |
| 2010/0085937 A1 * | 4/2010 | Pressley et al. | ................ | 370/331 |
| 2010/0266107 A1 * | 10/2010 | Brusilovsky et al. | ........... | 379/46 |
| 2011/0265158 A1 * | 10/2011 | Cha et al. | .......................... | 726/6 |
| 2012/0282915 A1 * | 11/2012 | Haynes et al. | .............. | 455/422.1 |
| 2013/0012165 A1 * | 1/2013 | Popovich et al. | ............. | 455/411 |
| 2013/0013923 A1 * | 1/2013 | Thomas et al. | ............... | 713/168 |
| 2013/0035067 A1 * | 2/2013 | Zhang et al. | .................. | 455/411 |
| 2013/0117568 A1 * | 5/2013 | Carroll | .......................... | 713/171 |

OTHER PUBLICATIONS

3GPP TS 24.008 V 11.4.0; "Technical Specification Group Core Network and Terminals; Mobile radion interface Layer 3 specification; Core Network protocols; Stage 3"; Release 11; Sep. 2012; pp. 1-672.

3GPP TS 23.060 V 11.3.0; "Technical Specification Group Services and System Aspects; General Pack Radio Service (GPRS); Service description"; Stage 2; Release 11; Sep. 2012; pp. 1-333.

P. Calhoun et al.; "Diameter Base Protocol"; rfc 3588; Network Working Group; Standard Track; Sep. 2003; pp. 1-120.

* cited by examiner

*Primary Examiner* — Yin-Chen Shaw
*Assistant Examiner* — John B King
(74) *Attorney, Agent, or Firm* — Schwabe, Williamson & Wyatt, P.C.

(57) ABSTRACT

According to various aspects of this disclosure, a circuit arrangement is provided. The circuit arrangement may include: a memory configured to store a first encryption key for generating a first authentication vector for authentication between a mobile station and a home network of the mobile station; and a key-generator configured to derive a second encryption key from the first encryption key, the second encryption key for generating a second authentication vector for authentication between the mobile station and a visited network.

18 Claims, 18 Drawing Sheets

CIRCUIT ARRANGEMENT AND A METHOD FOR ROAMING BETWEEN A VISITED NETWORK AND A MOBILE STATION

TECHNICAL FIELD

Various aspects of this disclosure relate to a circuit arrangement and a method for roaming between a visited network and a mobile station.

BACKGROUND

Roaming may refer to the extension of connectivity service in a location that is different from the home location where the service was registered. In legacy roaming, i.e. conventional roaming, all session keys are generated in a home network and transferred to a visited network. The visited network may then authenticate a mobile station subscriber, and generate charging records in order to charge the subscriber for using the visited network. The possibility to roam and the choice of roaming network operator, namely, the visited network, may be a decision of the home network operator only. The ability for a mobile station subscriber to set up a roaming connection directly with the visited network without having to use the home network as an intermediary may be desirable.

SUMMARY

According to various aspects of this disclosure, a circuit arrangement is provided. The circuit arrangement may include: a memory configured to store a first encryption key for generating a first authentication vector for authentication between a mobile station and a home network of the mobile station; and a key-generator configured to derive a second encryption key from the first encryption key, the second encryption key for generating a second authentication vector for authentication between the mobile station and a visited network.

According to various aspects of this disclosure, a method for roaming between a visited network and a mobile station is provided. The method may include: storing a first encryption key for generating a first authentication vector for authentication between the mobile station and a home network; and deriving a second encryption key from the first encryption key, the second encryption key for generating a second authentication vector for authentication between the mobile station and a visited network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which.

DESCRIPTION

The following detailed description refers to the accompanying drawings that show, by way of illustration, specific details and aspects in which this disclosure may be practiced. These aspects of the disclosure are described in sufficient detail to enable those skilled in the art to practice the disclosure. Other aspects of this disclosure may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects of this disclosure.

Figure 1:
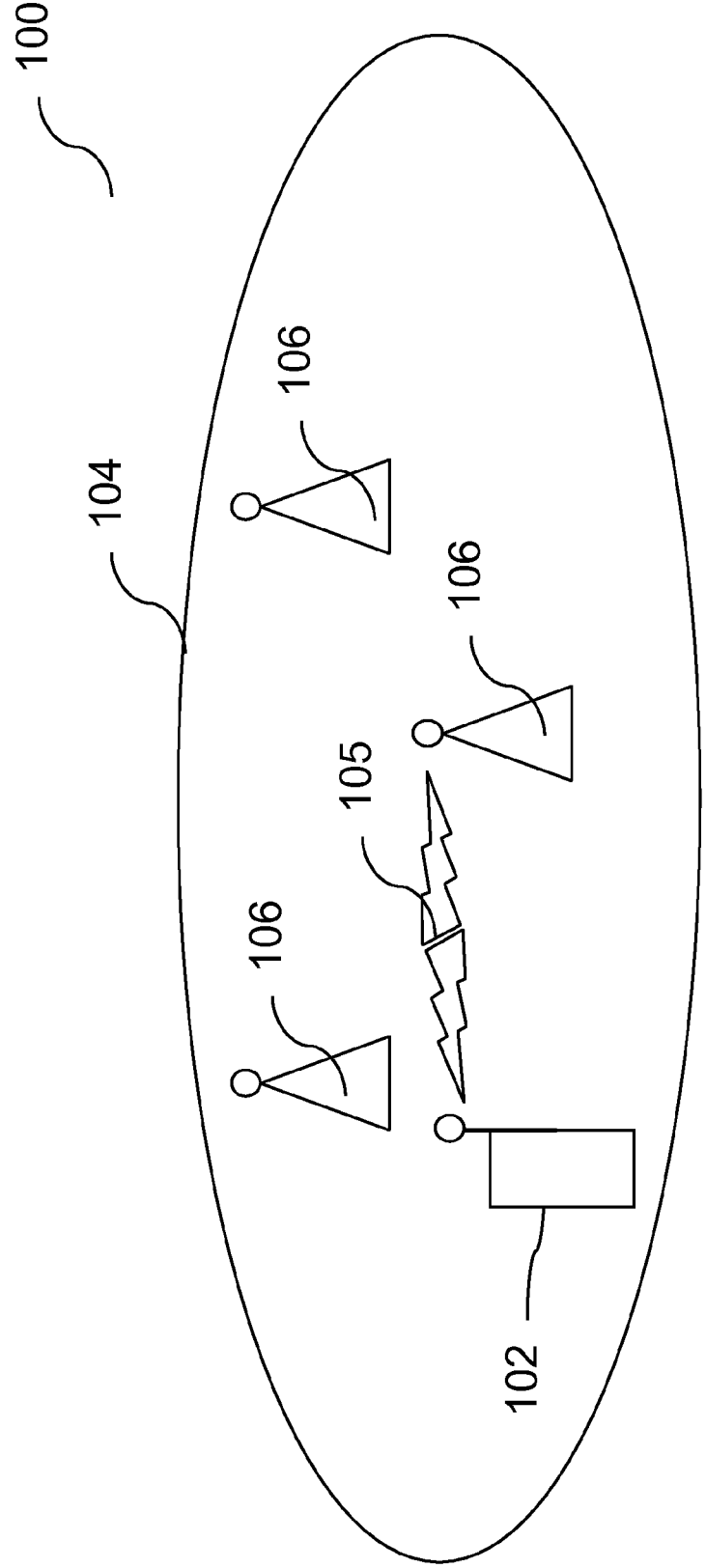
FIG. 1 shows a communication system according to an aspect of this disclosure.

FIG. 1 shows a communication system 100 according to an aspect of this disclosure.

The communication system 100 may be configured in accordance with the network architecture of any one of, or any combination of, a LTE (Long Term Evolution) cellular communications system, WLAN (wireless local area network), WiFi, UMTS (Universal Mobile Telecommunications System), GSM (Global System for Mobile Communications), Bluetooth, CDMA (Code Division Multiple Access) cellular communications system, etc.

A mobile station 102, such as, for example, a UE (user equipment) equipped with a SIM (Subscriber Identity Module) running on a UICC (Universal Integrated Circuit Card), may be registered with a home network 104 (such as, for example, a HPLMN (Home Public Land Mobile Network)). By way of example, a mobile station 102 may be registered with a home network 104 if the mobile station 102 has a pre-existing entry in the home subscriber register of the home network 104. In the case of a GSM network, the home subscriber register may be a Home Location Register (HLR), whilst the home subscriber register in WLANs may be a local customer database.

If the mobile station 102 is registered with the home network 104, the home network 104 may be configured to provide wireless connectivity to the mobile station 102 over a given geographical area of coverage. The home network 104 may include at least one base (transceiver) station 106, wherein the base stations 106 may be interconnected with one another. The total geographical area of coverage may be determined by the total, collective coverage area of the base stations 106. When the mobile station 102 is within the area of coverage of the home network 104, the mobile station 102 may be able to make and receive voice calls, send and receive data, or access other service, such as, for example, data services (connection shown in 105).

Figure 2:
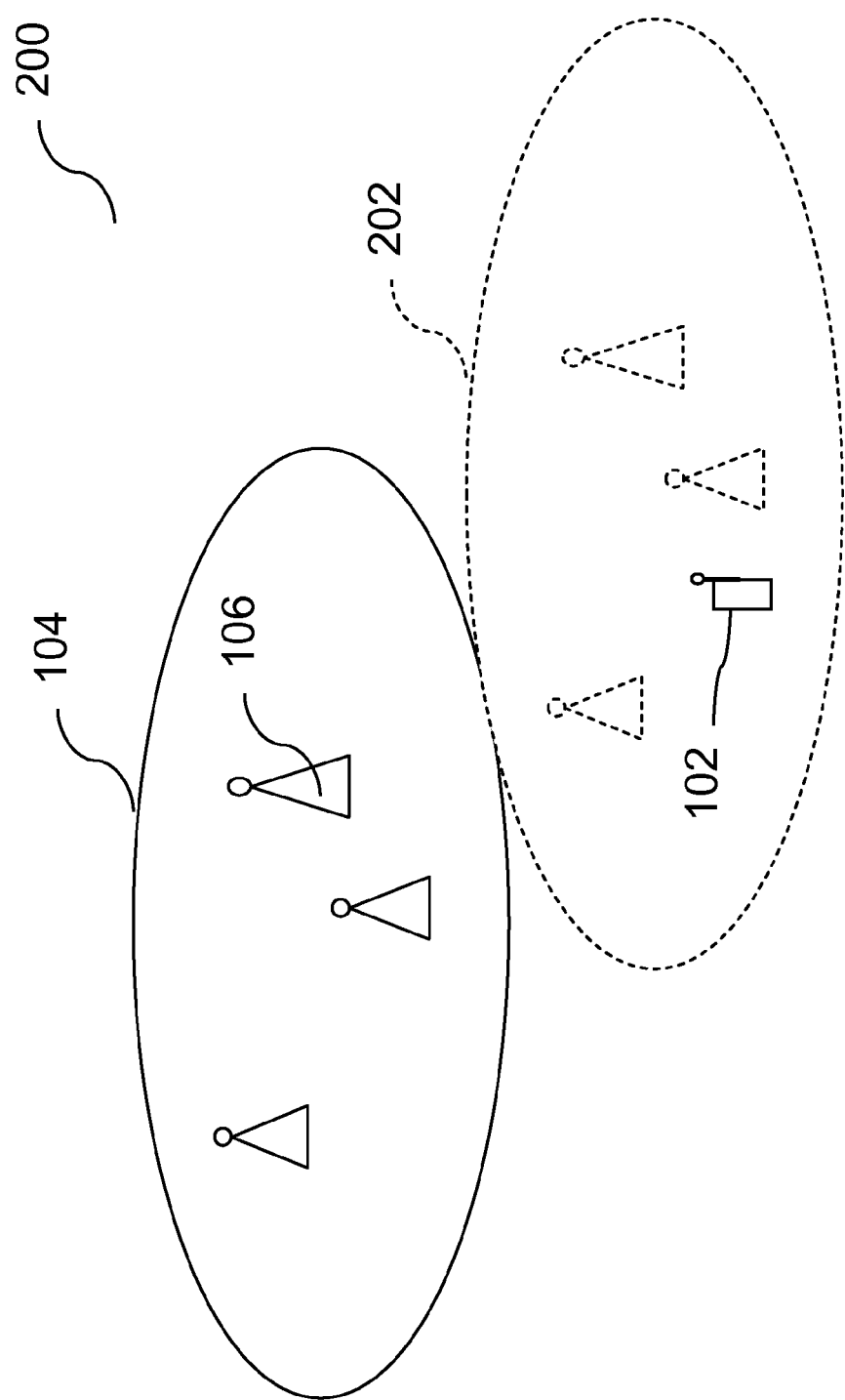
FIG. 2 shows a communication system according to another aspect of this disclosure.

FIG. 2 shows a communication system 200 according to another aspect of this disclosure.

The communication system 200 includes the home network 104 and a visited network 202.

According to various aspects of this disclosure, the mobile station 102 may be able to maintain wireless connectivity when it is outside the area covered by the home network 104. This may be accomplished through roaming Roaming may refer to the extension of connectivity service in a location that is different from the home network 104, such as, for example, in the visited network 202 (such as, for example, a VPLMN (Visited Public Land Mobile Network)). Consequently, roaming may allow the mobile station 102 to maintain its ability to make and receive voice calls, send and receive data, or access other service, such as, for example, data services when travelling outside the geographical coverage area of the home network 104, using the visited network 202. Roaming may be supported by mobility management, authentication, authorization and billing procedures.

The differentiation between the home network 104 and the visited network 202 may be given by the type of subscriber entry in either network. If the mobile station 102 has no entry in the subscriber register of the visited network 202, the required subscriber data may first be requested by the visited network 202. The visited network 202 may request the required subscriber data from the subscriber's home network 104 in order that the subscriber, such as, for example, mobile station 102, may be authenticated and any authorization for using the network services of the visited network 202 may be checked. The "visiting" subscriber, such as, for example, mobile station 102 within the area of coverage of the visited network 202, may acquire an entry in a user database of the visited network 202 (e.g. Visited Location Register (VLR)) and the authorized network services may be enabled. Consequently, the mobile station 102 may be able to make and receive voice calls, send and receive data, or access other service, such as, for example, data services whilst in the visited network 202.

Although roaming has been described in respect of the continuity of network connectivity as a mobile station 102 moves from one geographical region to another, roaming may also refer to the continuity of connectivity as the mobile station 102 moves among different network standards, i.e. when the mobile station 102 moves from a first network provider configured to provide connectivity in accordance with a first network architecture to a second network provider configured to provide connectivity in accordance with a second network architecture that is different from the first network architecture. The network architecture of each of the first and second network providers may be a LTE (Long Term Evolution) cellular communications system, WLAN (wireless local area network), Wi-Fi, UMTS (Universal Mobile Telecommunications System), GSM (Global System for Mobile Communications), Bluetooth, CDMA (Code Division Multiple Access) cellular communications system, etc. Accordingly, roaming, as used herein, may refer to regional roaming, national roaming, international roaming, inter-standards roaming, etc. Each of these roaming scenarios is described below.

Regional roaming may refer to the ability to move from one region to another region within the national coverage of a particular mobile operator. Regional roaming may be offered to subscribers of mobile stations 102 in countries with wide geographic areas like the USA, Russia, India, etc., in which there are a number of regional operators.

National roaming may refer to the ability to move from one mobile operator to another in the same country.

International roaming may refer to the ability to move to a foreign service provider's network. It is, consequently, of particular interest to international tourists and business travelers. In international roaming, the home network 104 and the visited network 202 may have different frequency allocations. By way of example, most GSM countries use 900/1800 MHz for mobile communications, but the United States and some other countries in the Americas have allocated 850/1900 MHz. Accordingly, a mobile station 102 may be able to support one or both frequencies allocated to the home network 104 and the visited network 202.

Inter-standards roaming may refer to the ability to move seamlessly between mobile networks of different technologies within the same geographical area, or between different geographical areas.

In light of the various scenarios included in roaming, the area of coverage of the home network 104 may at least partially overlap with the area of coverage of the visited network. Alternatively, the area of coverage of the home network 104 may be distinct from, and not overlap with, the area of coverage of the visited network 202.

Figure 3:
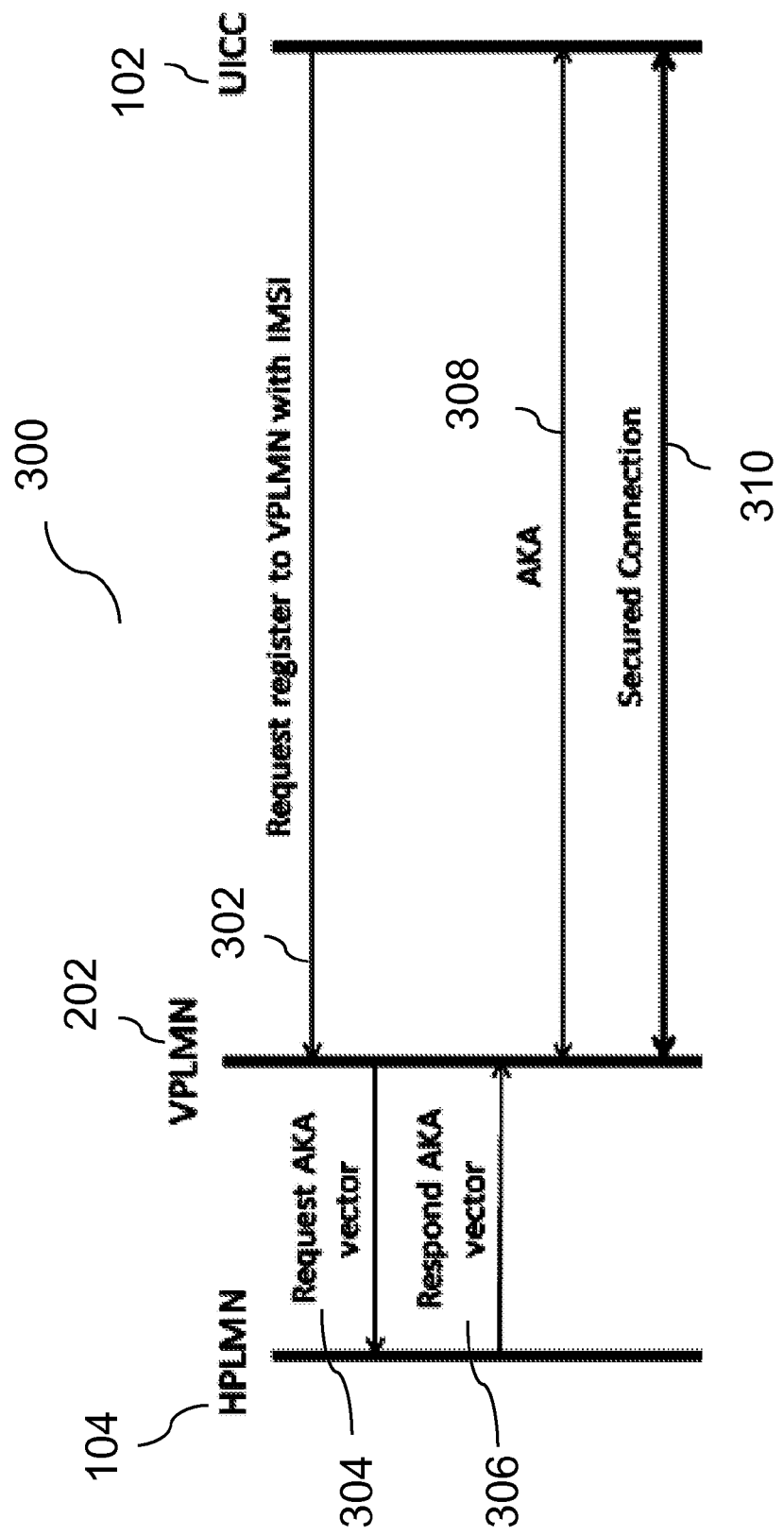
FIG. 3 shows a message flow diagram for legacy roaming between a visited network and a mobile station according to an aspect of this disclosure.

FIG. 3 shows a message flow diagram for roaming between a visited network and a mobile station according to an aspect of this disclosure.

The message flow takes place between the home network 104 (such as, for example, a HPLMN), a visited network 202 (such as, for example, a VPLMN), and a mobile station 102 (such as, for example, through the UICC of the mobile station).

The specific details of the roaming process between a visited network and a mobile station may differ among types of cellular networks, such as, for example, LTE (Long Term Evolution) cellular communications system, WLAN (wireless local area network), WiFi, UMTS (Universal Mobile Telecommunications System), GSM (Global System for Mobile Communications), Bluetooth, CDMA (Code Division Multiple Access) cellular communications system, etc. However, the process may generally resemble the message flow diagram of FIG. 3.

When the mobile station 102 is turned on or is transferred via a handover from the home network 104 to the visited network 202, the visited network 202 may receive a request for registration with the visited network from the mobile station 102 by means of message 302. The request from the mobile station sent by means of message 302 may include the international mobile subscriber identity (IMSI) of the mobile station 102. At this time, the visited network 202 may notice that the mobile station 102 is not registered with its own system, and attempts to identify the mobile station's home network. If there is no roaming agreement between the home and visited networks, maintenance of service may not be possible, and service to the mobile station 102 may be denied by the visited network 202.

In the event where there is a roaming agreement between visited network 202 and the home network 104, the visited network 202 may request for an authentication vector by means of a message 304. In various aspects of this disclosure, the authentication vector may be used for a challenge-response based mechanism that establishes a connection between the visited network 202 and the mobile station 102. The challenge-response mechanism may use symmetric cryptography, such as, for example, the authentication and key agreement (AKA) protocol.

In the challenge-response mechanism, the authentication vector may be generated using at least one random number and an encryption key. The home network 104, upon generating the authentication vector, such as, for example an AKA vector, may provide the visited network 202 with this authentication vector by means of message 306. The home network 104 may additionally provide the visited network 202 with the at least one random number used to generate the authentication vector.

The visited network 202 may then proceed to authenticate the mobile station 102 by means of message exchange 308. In this authentication step, the visited network 202 may hold the authentication vector provided to it by the home network 104, whilst providing the mobile station 102 with the at least one random number. The encryption key present in the home network 104 may also be stored in the mobile station 102. Accordingly, the mobile station 102 may be able to regenerate the authentication vector from the at least one random number provided to it by the visited network 202 and the stored encryption key. If the authentication vector generated by the mobile station 102 matches the authentication vector stored in the visited network 202, the visited network 202 creates an entry for the mobile station 102 in the VLR, and a secured connection 310 between the visited network 202 and the mobile station 102 may then be established.

As may be seen in FIG. 3, all necessary subscription data are stored in the mobile station 102 and in a database of the home network 104. With regards to the mobile station 102, all necessary subscription data may be stored in the SIM, whilst all necessary subscription data may be stored in the HLR (Home Location Register) of the home network 104. Further, the encryption key may be shared between the home network 104 and the mobile station 102, but not revealed to the visited network 202. Accordingly, the shared encryption key may not leave the mobile station 102 or the home network 104. All keys for encryption and integrity protection, such as, for example, session keys, may be derived out of the shared encryption key.

Further, all session keys, such as, for example, the authentication vector, are generated in home network 104 and transferred to the visited network 202. The visited network 202 may then generate charging records in order to charge the mobile station 102 for using the visited network 202. The possibility to roam and the choice of roaming operator, namely, the visited network, may be a decision of the home operator. These roaming costs may be significantly higher than non-roaming costs.

According to one aspect of this disclosure, the mobile station 102 may have a direct, temporary, contractual relationship with a visited network 202, including free choice by the mobile station 102 of a particular visited network 202, without having the home network 104 control the choice of visited network 202, or the terms of the relationship between the visited network 202 and the mobile station 102. Accordingly, according to one aspect of this disclosure, the visited network 202 and the mobile station 102 may establish a connection between each other using an authentication vector generated by a second encryption key, which is known to both the visited network 202 and the mobile station 102. This may be seen to be in contrast to normal roaming, or legacy roaming, in which the visited network 202 and the mobile station 102 establish a connection between each other using an authentication vector provided by the home network 104 to the visited network 202, wherein the authentication vector is generated using a first encryption key known to the home network 104, but not to the visited network 202.

In summary, legacy roaming may be based on message flow where the subscriber, such as, for example, the mobile station 102, is authenticated via the HLR of the home network 104, and session keys are transferred to the visited network 202 from the home network 104, and a secure connection between the mobile station 102 and visited network 202 is thereafter established.

Figure 4:
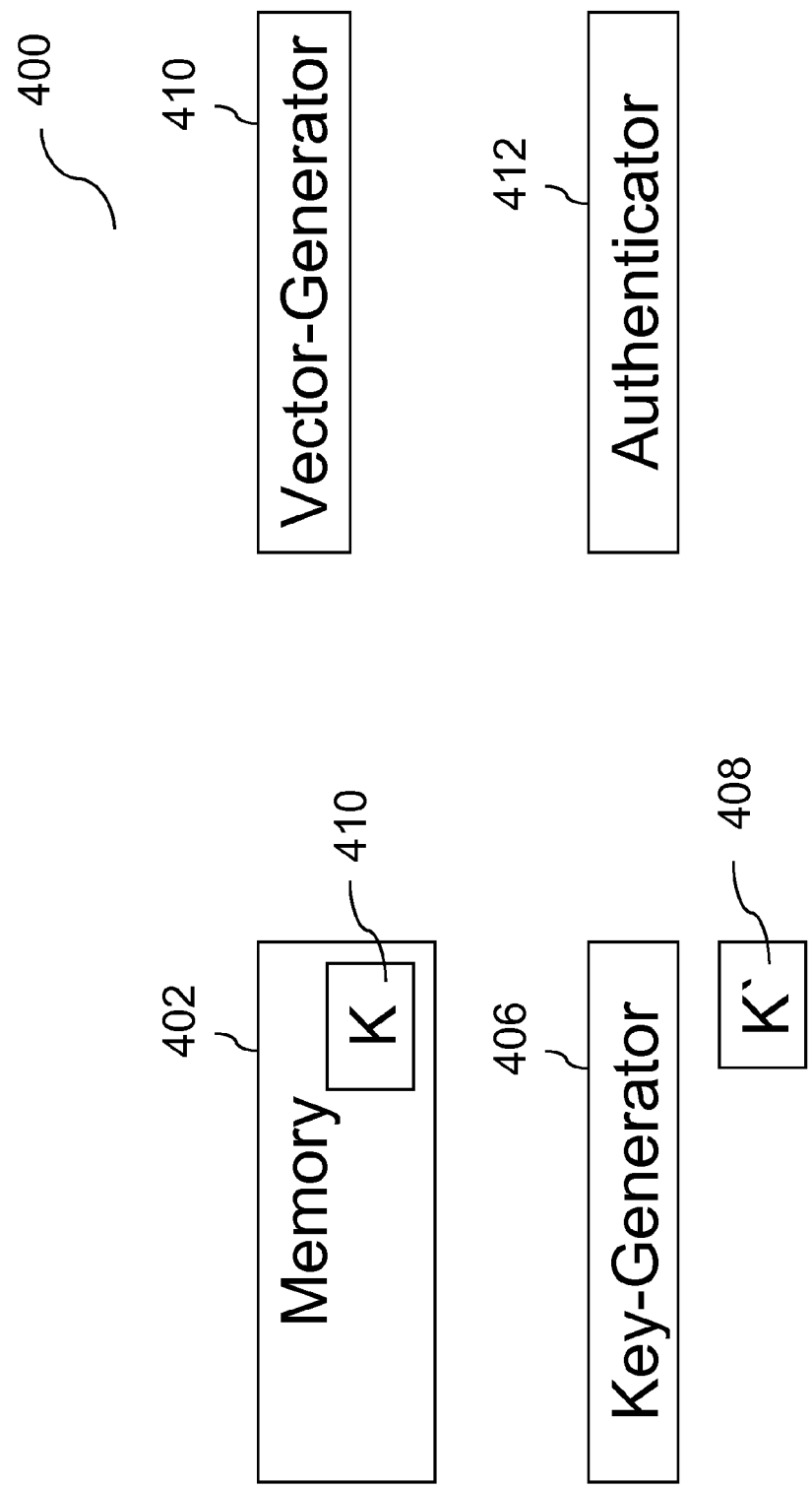
FIG. 4 shows a circuit arrangement according to various aspects of this disclosure.

FIG. 4 shows a circuit arrangement according to various aspects of this disclosure.

The word "circuit" is used herein to mean any kind of a logic implementing entity, which may be special purpose circuitry or processor executing software stored in a memory, firmware, or any combination thereof. Thus, in an aspect of this disclosure, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Different circuits can thus also be implemented by the same component, e.g. by a processor executing two different programs.

According to various aspects of this disclosure, a circuit arrangement 400 is provided. The circuit arrangement 400 may include a memory 402 configured to store a first encryption key, e.g. denoted as K in the following and as 410 in FIG. 4. The first encryption key, K, may be used for generating a first authentication vector for authentication between a mobile station and a home network. By way of example, the first encryption key, K, may be used to generate an AKA vector for a challenge-response scheme that may establish a secure connection between the home network 104 and the mobile station 102.

The circuit arrangement 400 may include a key-generator 406 configured to derive a second encryption key, e.g. denoted as K' in the following and as 408 in FIG. 4, from the first encryption key, K. The second encryption key, K', may be suitable for generating a second authentication vector for authentication between the mobile station and a visited network. By way of example, the second encryption key, K', may be generated from the first encryption key, K, using a key derivation function (KDF), such as, for example, HMAC-SHA-256, or the like. The second encryption key, K', may also be generated from the first encryption key, K, the MCC (Mobile Country Code), and the MNC (Mobile network code) of the home network 104 and/or the visited network 202. Further, the second encryption key, K', may be used to generate an AKA vector for a challenge-response scheme between the visited network 202 and the mobile station 102 that may establish a secure connection between the visited network 202 and the mobile station 102.

The circuit arrangement 400 may include a vector-generator 410 configured to generate the second authentication vector from the second encryption key, K'. By way of example, the second authentication vector may be generated using the second encryption key K' and a number or string generated by a random number generator. The generation of the second authentication vector may follow the AKA protocol, or any algorithm or any hash function.

The circuit arrangement 400 may include an authenticator 412 configured to establish a connection between the mobile station and the visited network with the second authentication vector. By way of example, the second authentication vector generated by vector generator 410 may be used in the challenge-response scheme between the visited network 202 and the mobile station 102 that may establish a secure connection between the visited network 202 and the mobile station 102. In various aspects of this disclosure, the authenticator may be configured to establish the connection between the mobile station 102 and the visited network 202 with the second authentication vector using an AKA protocol, such as, for example, as shown in FIG. 3.

Figure 5:
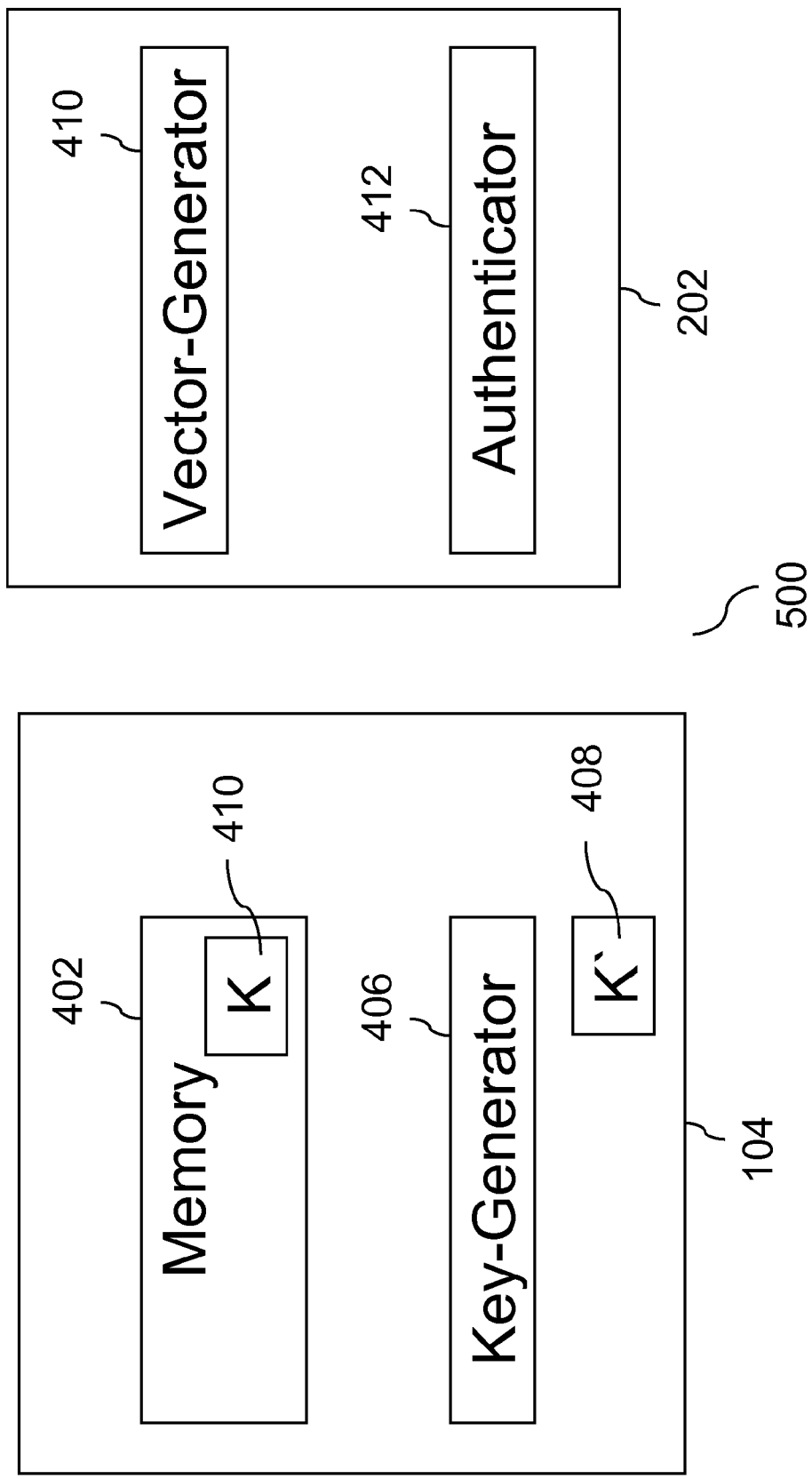
FIG. 5 shows a circuit arrangement including a home network and a visited network according to various aspects of this disclosure.

FIG. 5 shows a circuit arrangement 500 including a home network and a visited network according to various aspects of this disclosure.

In various aspects of this disclosure, the memory 402 and the key-generator 406 may be arranged in the home network 104, whilst the vector-generator 410 and the authenticator 412 may be arranged in the visited network 202 as shown in FIG. 5.

Figure 6:
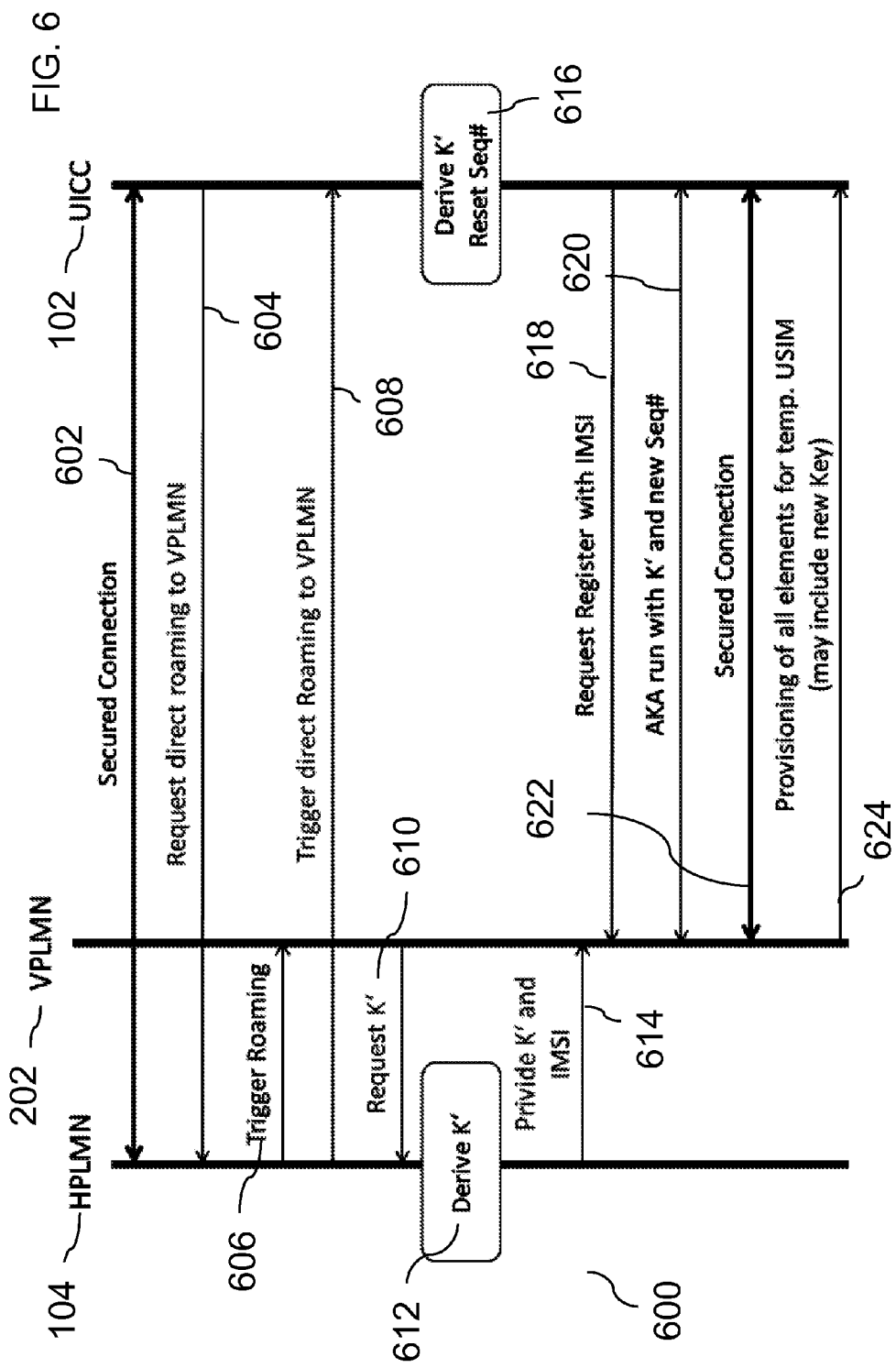
FIG. 6 shows a message flow diagram according to various aspects of this disclosure.

FIG. 6 shows a message flow diagram according to various aspects of this disclosure.

The message flow takes place between the home network 104 (such as, for example, a HPLMN), a visited network 202 (such as, for example, a VPLMN), and a mobile station 102 (such as, for example, through the UICC of the mobile station).

In the circuit arrangement 500 where the memory 402 and the key-generator 406 may be arranged in the home network 104, and the vector-generator 410 and the authenticator 412 may be arranged in the visited network 202, there may exist a secure connection 602 between the home network 104 and the mobile station 102. The secure connection 602 between the home network 104 and the mobile station 102 may be established using a challenge-response scheme, such as, for example, the AKA protocol, using the first authentication vector. The first authentication vector may be generated using the first encryption key, K.

The mobile station 102 may provide a request for roaming to the home network 104 by means of message 604. Accordingly, the home network 104 may receive the request for roaming by means of message 604 from the mobile station 102. The request for roaming may include a request for connectivity between the visited network 202 and the mobile station 102. In addition, the request for roaming by means of message 604 may include a data field indicating the visited network 202 preferred by the mobile station 102. In this way, the mobile station 102 may be free to choose which visited network 202 to establish a roaming relationship with.

Accordingly, the home network 104 may be configured to receive a request for roaming from the mobile station, wherein the request for roaming includes a request for connectivity between the visited network and the mobile station. Further, the request for roaming may include a data field indicating the visited network preferred by the mobile station.

In response to the request for roaming by the mobile station 102, the home network 104 may provide an instruction for roaming to the visited network 202 by means of message 606 and to the mobile station 102 by means of message 608. The instruction for roaming by means of messages 606 and 608 may include an instruction to establish connectivity between the visited network 202 and the mobile station 102. The instruction for roaming may include a roaming trigger, wherein the roaming trigger may include instructions for the mobile station 102 to dissociate from the home network 104, to associate with the visited network 202, and to authenticate with the visited network 202. Accordingly, the home network may be configured to provide an instruction for roaming to each of the visited network and the mobile station, the instruction for roaming including an instruction to establish connectivity between the visited network and the mobile station.

The instruction for roaming provided by the home network 104 to the visited network 202 (by means of message 606) may trigger the visited network 202 to provide a request for the second encryption key, K', to the home network 104 by means of message 610. Accordingly, the key-generator 406 arranged in the home network 104 may derive the second encryption key, K' (612), from the first encryption key, K (stored in the memory 402 arranged in the home network 104). The second encryption key, K', may be derived after the home network 104 has received the request for the second encryption key by means of message 610 from the visited network 202. Accordingly, the visited network may be configured to provide a request for the second encryption key to the home network, and the key-generator may be configured to derive the second encryption key from the first encryption key after the home network has received the request for the second encryption key from the visited network.

The home network 104 may provide the derived second encryption key, K', to the visited network 202 by means of message 614 after the key-generator has derived the second encryption key. Accordingly, the home network 104 may be configured to provide the derived second encryption key, K', to the visited network 202 by means of message 614, and the visited network 202 may be configured to receive the second encryption key, K', from the home network 104.

The home network 104 may additionally provide the IMSI (international mobile subscriber identity) of the mobile station 102 to the visited network 202 (by means of message 614). Accordingly, the home network may be configured to provide the IMSI (international mobile subscriber identity) of the mobile station to the visited network, and the visited network may be configured to receive the international mobile subscriber identity of the mobile station from the home network.

Figure 7:
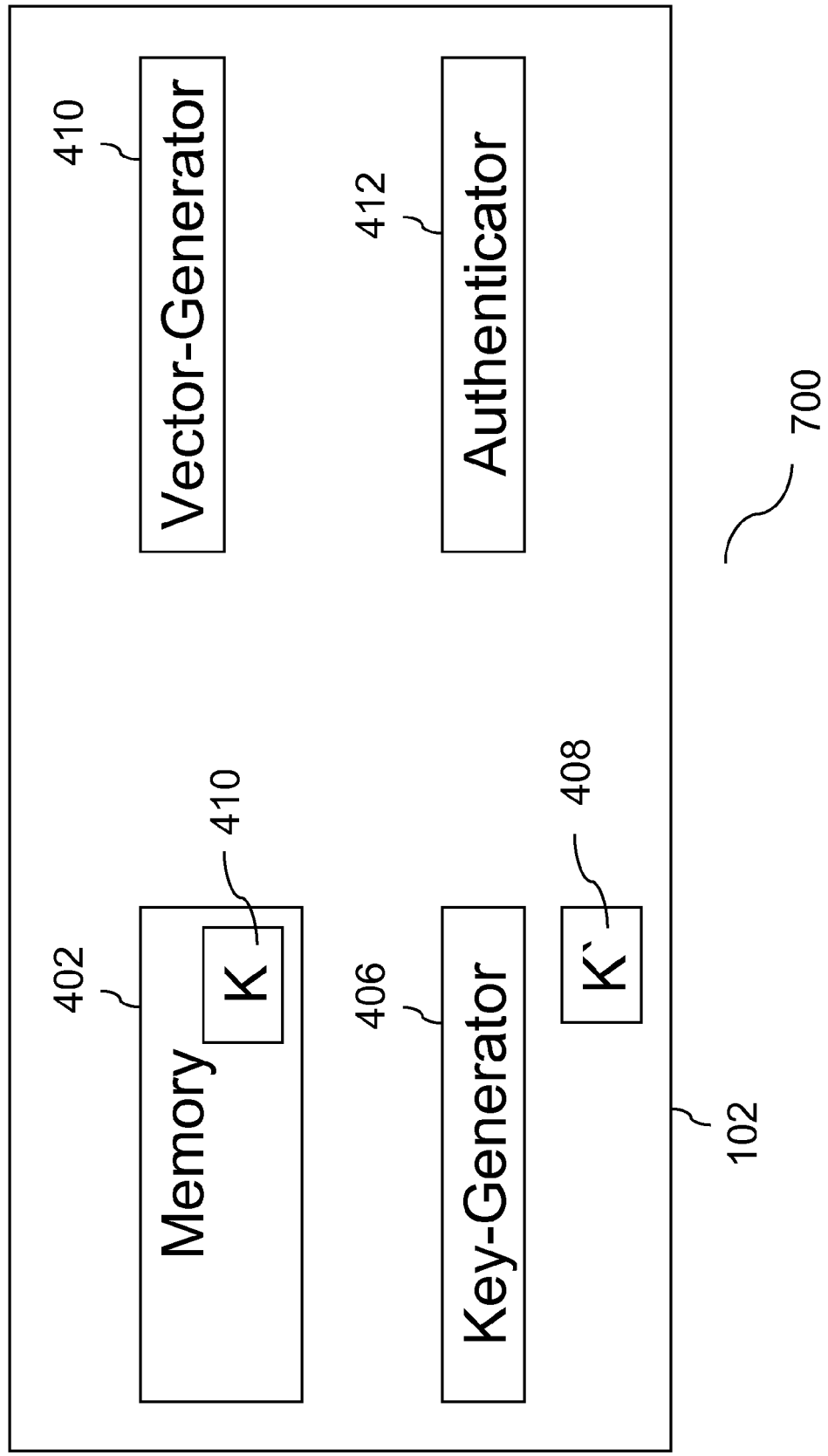
FIG. 7 shows a circuit arrangement including a mobile station according to various aspects of this disclosure.

FIG. 7 shows a circuit arrangement including a mobile station according to various aspects of this disclosure.

In various aspects of this disclosure, the memory 404, the key-generator 406, the vector-generator 410 and the authenticator 412 may be arranged in the mobile station 102 as shown in FIG. 7.

The instruction for roaming provided by the home network 104 to the mobile station 102 by means of message 608 may trigger the key-generator 406 arranged in the mobile station 102 to derive the second encryption key, K', from the first encryption key, K, (616) after the mobile station 102 has received the instruction for roaming by means of message 608 from the home network 104. Accordingly, the mobile station may be configured to receive the instruction for roaming from the home network, and the key-generator included in the mobile station may be configured to derive the second encryption key from the first encryption key after the mobile station has received the instruction for roaming from the home network.

Once each of the mobile station 102 and the visited network 202 has the second encryption key, K', the mobile station 102 may establish a roaming connection directly with the visited network 202, and not through the home network 104. In various aspects of this disclosure, this may be accomplished by a request for registration sent from the mobile station 102 to the visited network 202 by means of message 618. Upon receipt of the request for registration, the visited network 202 and the mobile station 102 may utilize a challenge-response scheme to establish a secure connection between the mobile station 102 and the visited network 202. By way of example, the mobile station 102 may generate a random number or string (Seq# of 616), and use the second encryption key, K', to generate a second authentication vector. The mobile station may provide the generated random number or string to the visited network 202 in the request for registration sent to the visited network 202 by means of message 618. The visited network 202 may then generate a vector using its second encryption key, K', namely, the key provided to it by the home network 104 by means of message 614. The authentication vectors generated by the visited network 202 and the mobile station 102 may be compared by means of message exchange 620, and if they are identical, a secure connection 622 between the visited network 202 and the mobile station 102 may be established. Upon establishing the secure connection between the visited network 202 and the mobile station 102, the visited network 202 may provide the mobile station 102 with the necessary subscription data for direct roaming between the visited network 202 and the mobile station 102 by means of message 624. Accordingly, in various aspects of this disclosure, the mobile station 102 may include a temporary SIM configured to store the necessary subscription data for direct roaming between the visited network 202 and the mobile station 102. The temporary SIM may be run by the UICC of the mobile station 102. In various aspects of this disclosure, the necessary subscription data for direct roaming provided by means of message 624 may include a third encryption key that may be distinct from the first encryption key, K, and the second encryption key, K.

Accordingly, in the message flow diagram of FIG. 6, direct roaming between the visited network 202 and the mobile station 102 may be accomplished through the request for roaming (by means of message 604), the instructions for roaming (by means of messages 606 and 608), the request for the second encryption key (by means of message 610), and the provisioning of the second encryption key (by means of message 614).

In various aspects of this disclosure, the instruction for roaming (by means of messages 606 and 608)—which may include an instruction to establish connectivity between the visited network and the mobile station—may be a NAS (Non Access Stratum) Mobility Management Message. By way of example, a network initiated GPRS detach procedure or network initiated IMSI detach procedure could be performed. The detach type information element "re-attach required" with a new inventive cause code "switch to direct roaming" may cause the mobile station to derive K', reset the sequence number (namely, Seq#), and perform a re-attach with K' and Seq#. After a successful AKA-run with these new parameters all other subscription data like operator preferred network may be sent securely to the mobile station. Since K' may be known in the home network 104, the visited network 202 may consider generating a network specific new encryption key (namely, the aforementioned third encryption key) for this temporary subscription between the mobile station 102 and the visited network 202. These features of the instruction for roaming are equally applicable to all other aspects of this disclosure that will follow.

In various aspects of this disclosure, the request for the second encryption key, K' (by means of message 610), and the providing of K' (by means of message 614) may be encapsulated in a DIAMETER message. DIAMETER may—as its predecessor, RADIUS—be an AAA protocol used between the visited network 202 and the home network 104 in the case of legacy roaming, and for authentication and accounting. The request for the second encryption key (by means of message 610) may be encapsulated in a DIAMETER "Capabilities-Exchange-Request", whilst provisioning of the second encryption key (by means of message 614) may be encapsulated in a DIAMETER "Capabilities-Exchange-Answer". These features of the request for the second encryption key, and the provisioning of the second encryption key are equally applicable to all other aspects of this disclosure that will follow.

Figure 8:
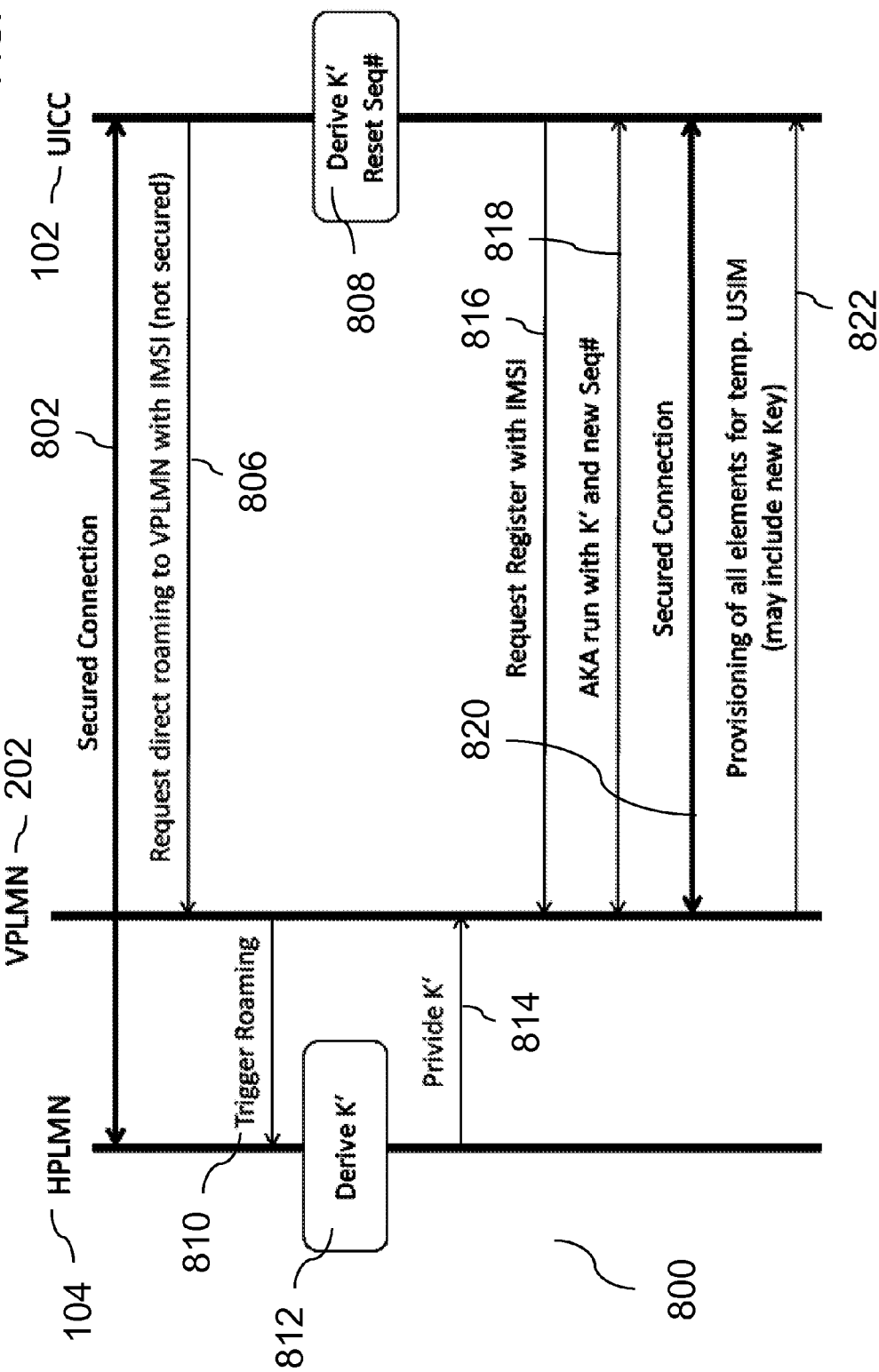
FIG. 8 shows a message flow diagram according to various aspects of this disclosure.

FIG. 8 shows a message flow diagram according to various aspects of this disclosure.

The message flow takes place between the home network 104 (such as, for example, a HPLMN), a visited network 202 (such as, for example, a VPLMN), and a mobile station 102 (such as, for example, through the UICC of the mobile station).

As shown in FIG. 5, the memory 402 and the key-generator 406 may be arranged in the home network 104, whilst the vector-generator 410 and the authenticator 412 may be arranged in the visited network 202. Further, as shown in FIG. 7, the memory 404, the key-generator 406, the vector-generator 410 and the authenticator 412 may be arranged in the mobile station 102. FIG. 8 shows a message flow diagram for such an arrangement.

The secure connection 802 between the home network 104 and the mobile station 102 may be established using a challenge—response scheme, such as, for example, the AKA protocol, using the first authentication vector. The first authentication vector may be generated using the first encryption key, K.

The mobile station 102 may be configured to provide the request for roaming (by means of message 806) to the visited network 202. The request for roaming may include the IMSI of the mobile station 102. The further features described above with reference to the request for roaming by means of message 604 are equally applicable, and hereby restated, in respect of the request for roaming by means of message 806. In various aspects of this disclosure, the key-generator 406 arranged in the mobile station 102 may be configured to derive the second encryption key, K', (808) from the first encryption key, K, after the mobile station 102 has provided the request for roaming to the visited network 202 (by means of message 806).

Upon receipt of the request for roaming (by means of message 806) from the mobile station 102 by the visited network 202, the visited network 202 may provide the instruction for roaming (by means of message 810) to the home network 104. After receipt of the instruction from roaming from the visited network 202, the key-generator 406 arranged in the home network 104 may derive the second encryption key, K', (812) from the first encryption key, K. Accordingly, the visited network may be configured to provide the instruction for roaming to the home network, and the key-generator may be configured to derive the second encryption key from the first encryption key after the home network has received the instruction for roaming from the visited network.

The home network 104 may provide the derived second encryption key, K', to the visited network 202 (by means of message 814) after it has been derived from the first encryption key. Accordingly, the home network 104 may be configured to provide the derived second encryption key, K', to the visited network 202 (by means of message 814), and the visited network 202 may be configured to receive the second encryption key, K', from the home network 104.

When each of the mobile station 102 and the visited network 202 has the second encryption key, K', the mobile station 102 may establish a roaming connection with the visited network 202 directly, and not through the home network 104. The further features described above with reference to messages 618, 620, 622, and 624 of FIG. 6 are equally application and hereby restated, in respect of messages 816, 818, 820, and 822, wherein a roaming connection between the visited network and the mobile station is established directly, and not through the home network 104.

Accordingly, in the message flow diagram of FIG. 8, direct roaming between the visited network 202 and the mobile station 102 may be accomplished through the request for roaming (by means of message 806), the instruction for roaming (by means of message 810), and the provisioning of the second encryption key (by means of message 814).

Figure 9:
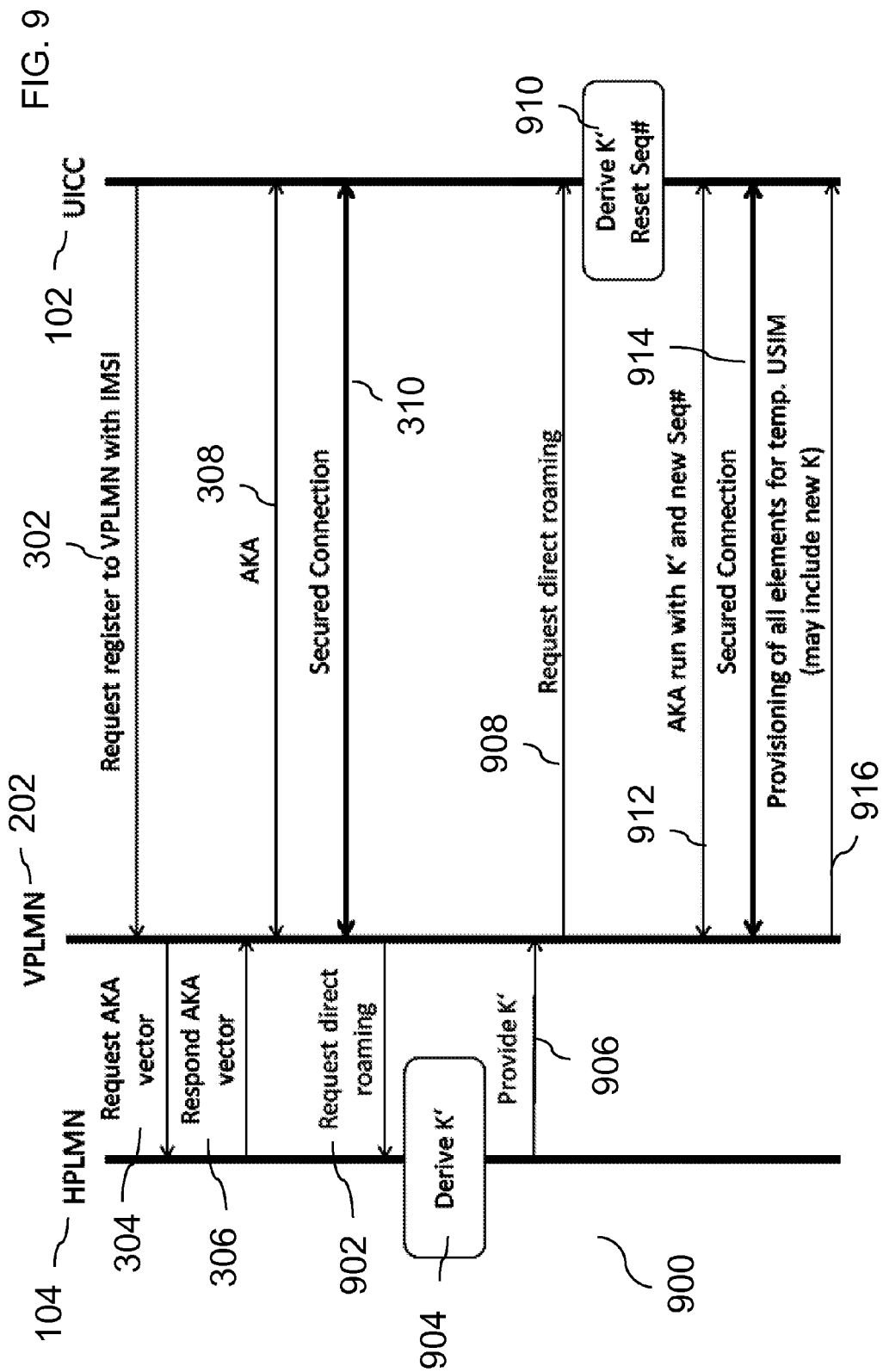
FIG. 9 shows a message flow diagram according to various aspects of this disclosure.

FIG. 9 shows a message flow diagram according to various aspects of this disclosure.

The message flow takes place between the home network 104 (such as, for example, a HPLMN), a visited network 202 (such as, for example, a VPLMN), and a mobile station 102 (such as, for example, through the UICC of the mobile station).

A roaming connection established directly between the mobile station 102 and the visited network 202 may be accomplished even after legacy roaming has occurred, as shown in FIG. 9.

In FIG. 9, a roaming connection between the mobile station 102 and the visited network 202 may be established through the home network by legacy roaming, described above in respect of FIG. 3 and messages 302, 304, 306, 308, 310.

The visited network 202 may provide a request for roaming to the home network 104 (by means of message 902). The further features described above with reference to the request for roaming by means of message 604 are equally applicable, and hereby restated, in respect of the request for roaming to the home network 104 by means of message 902.

The key-generator arranged in the home network 104 may derive the second encryption key, K', from the first encryption key, K, (904) after the home network 104 has received the request for roaming from the visited network 202. Accordingly, the visited network may be configured to provide the request for roaming to the home network, and the key-generator may be configured to derive the second encryption key from the first encryption key after the home network has received the request for roaming from the visited network.

The home network 104 may provide the derived second encryption key, K', to the visited network 202 (by means of message 906) after it has been derived from the first encryption key. Accordingly, the home network 104 may be configured to provide the derived second encryption key, K', to the visited network 202, and the visited network 202 may be configured to receive the second encryption key, K', from the home network 104.

Upon receipt of the second encryption key from the home network (by means of message 906), the visited network 202 may provide another request for roaming, but this time to the mobile station 102 (by means of message 908). Accordingly, the visited network may be configured to provide the request for roaming to the mobile station.

In response to the request for roaming from the visited network received by the mobile station 102, and the key-generator included in the mobile station 102 may derive the second encryption key (910) from the first encryption key after the visited network has provided the request for roaming to the mobile station. Accordingly, the mobile station may be configured to receive the request for roaming from the visited network, and the key-generator may be configured to derive the second encryption key from the first encryption key after the mobile station has received the request for roaming from the visited network.

Consequently, when each of the mobile station 102 and the visited network 202 has the second encryption key, K', the mobile station 102 may establish a roaming connection with the visited network 202 directly, and not through the home network 104. The further features described above with reference to messages 818, 820, and 822 of FIG. 8 are equally application and hereby restated, in respect of messages 912, 914, and 916 of FIG. 9, wherein a roaming connection between the visited network and the mobile station is established directly, and not through the home network 104.

Accordingly, in the message flow diagram of FIG. 9, direct roaming between the visited network 202 and the mobile station 102 may be accomplished through the request for roaming (by means of message 902), the provisioning of the second encryption key (by means of message 906), and another request for roaming (by means of message 908).

Figure 10:
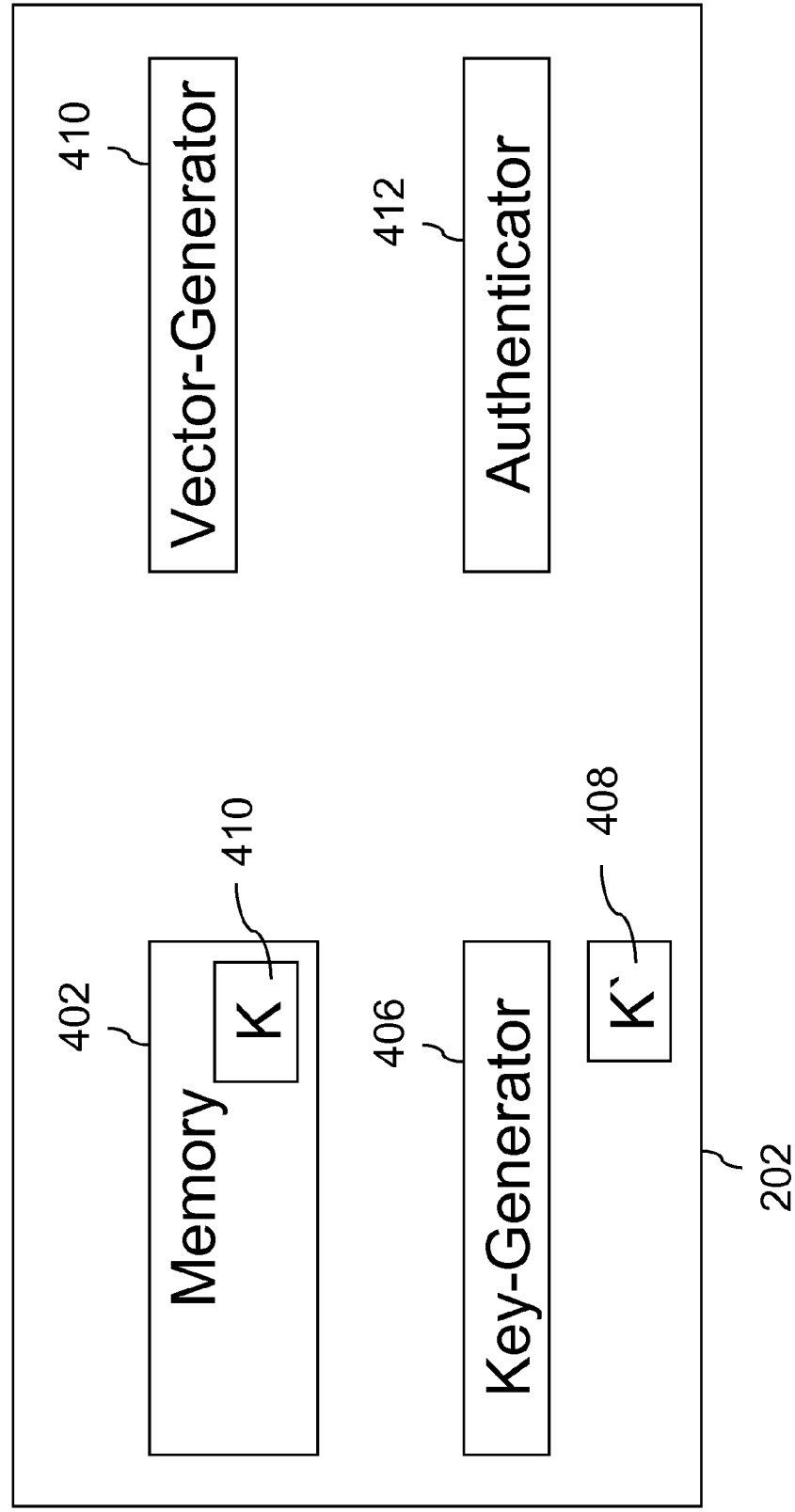
FIG. 10 shows a circuit arrangement including a visited network according to various aspects of this disclosure.

FIG. 10 shows a circuit arrangement including a visited network according to various aspects of this disclosure.

In various aspects of this disclosure, the memory 404, the key-generator 406, the vector-generator 410 and the authenticator 412 may be arranged in the visited network 202 as shown in FIG. 10.

Figure 11:
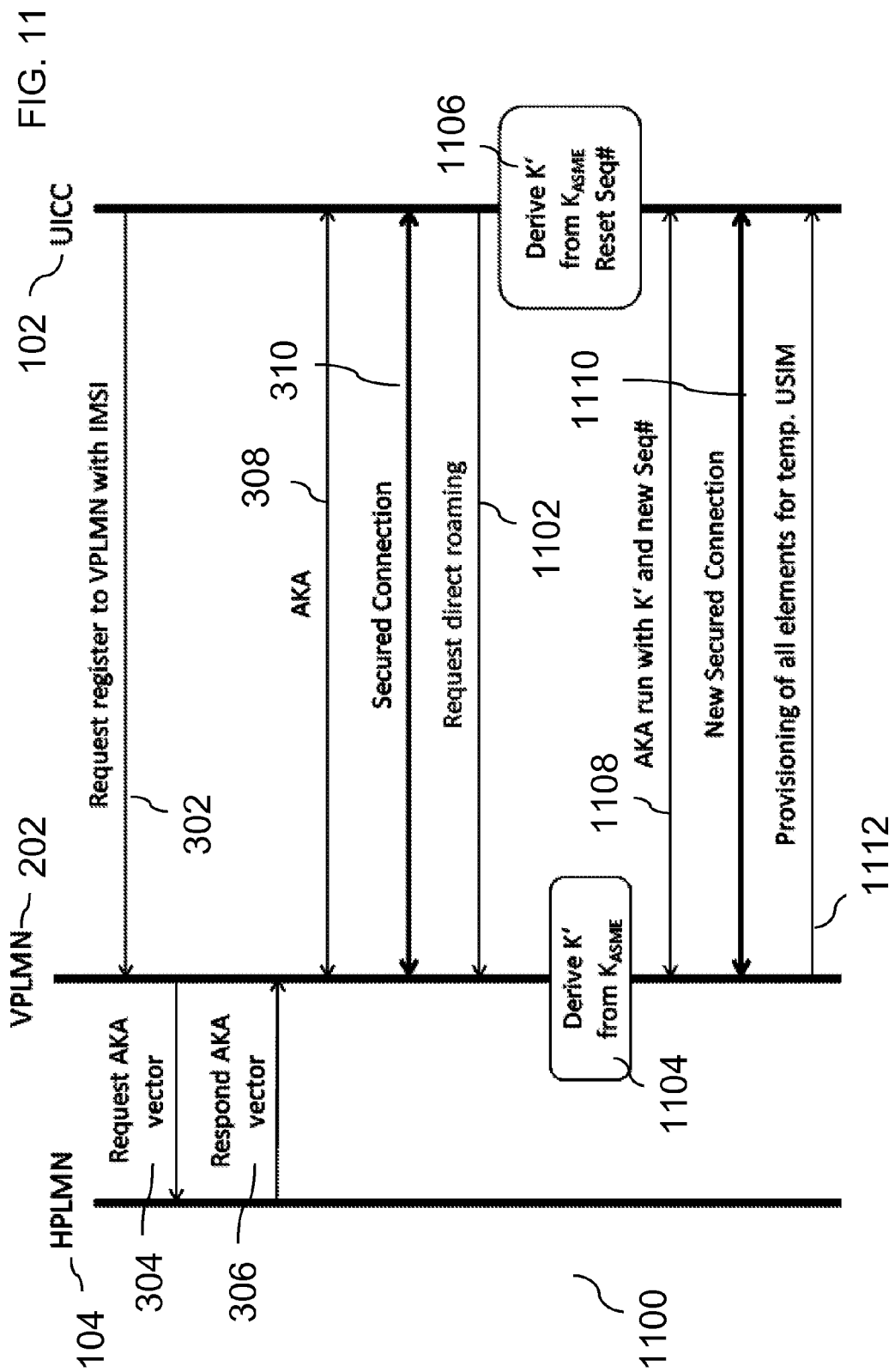
FIG. 11 shows a message flow diagram according to various aspects of this disclosure.

FIG. 11 shows a message flow diagram according to various aspects of this disclosure.

The message flow takes place between the home network 104 (such as, for example, a HPLMN), a visited network 202 (such as, for example, a VPLMN), and a mobile station 102 (such as, for example, through the UICC of the mobile station).

A roaming connection established directly between the mobile station 102 and the visited network 202 may be accomplished even after legacy roaming has occurred, as shown in FIG. 11.

In FIG. 11, a roaming connection between the mobile station 102 and the visited network 202 may be established through the home network by legacy roaming, described above in respect of FIG. 3 and messages 302, 304, 306, 308, 310.

The visited network 202 may receive a request for roaming (by means of message 1102) from the mobile device 102. As in the case of FIG. 10 where the memory 404, the key-generator 406, the vector-generator 410 and the authenticator 412 may be arranged in the visited network 202, the key generator included in the visited network 202 may derive the second encryption key, K', (1104) from a first encryption key after the visited network 202 has received the request for roaming (by means of message 1102) from the mobile station 102. The first encryption key may be an encryption key stored in the visited network 202, such as, for example, hierarchical keys generated between entities in LTE. Accordingly, the visited network may be configured to receive the request for roaming from the mobile station, and the key-generator included in the visited network may be configured to derive the second encryption key from the first encryption key after the visited network has received the request for roaming from the mobile station.

Simultaneously, the mobile station 102 may provide the request for roaming (by means of message 1102) to the visited network 202. As in the case of FIG. 7 where the memory 404, the key-generator 406, the vector-generator 410 and the authenticator 412 may be arranged in the mobile station 102, the key generator included in the mobile station 102 may derive the second encryption key, K', (1106) from a first encryption key after the mobile station 102 has provided the request for roaming (by means of message 1102) to the visited network 202. Accordingly, the mobile station may be configured to provide the request for roaming to the visited network, and the key-generator included in the mobile station may be configured to derive the second encryption key from the first encryption key after the mobile station has provided the request for roaming to the visited network.

Consequently, when each of the mobile station 102 and the visited network 202 has the second encryption key, K', the mobile station 102 may establish a roaming connection with the visited network 202 directly, and not through the home network 104. The further features described above with reference to messages 818, 820, and 822 of FIG. 8 are equally application and hereby restated, in respect of messages 1108, 1110, and 1112 of FIG. 11, wherein a roaming connection between the visited network 202 and the mobile station 102 is established directly, and not through the home network 104.

Accordingly, in the message flow diagram of FIG. 11, direct roaming between the visited network 202 and the mobile station 102 may be accomplished through the request for roaming (by means of message 1102).

Figure 12:
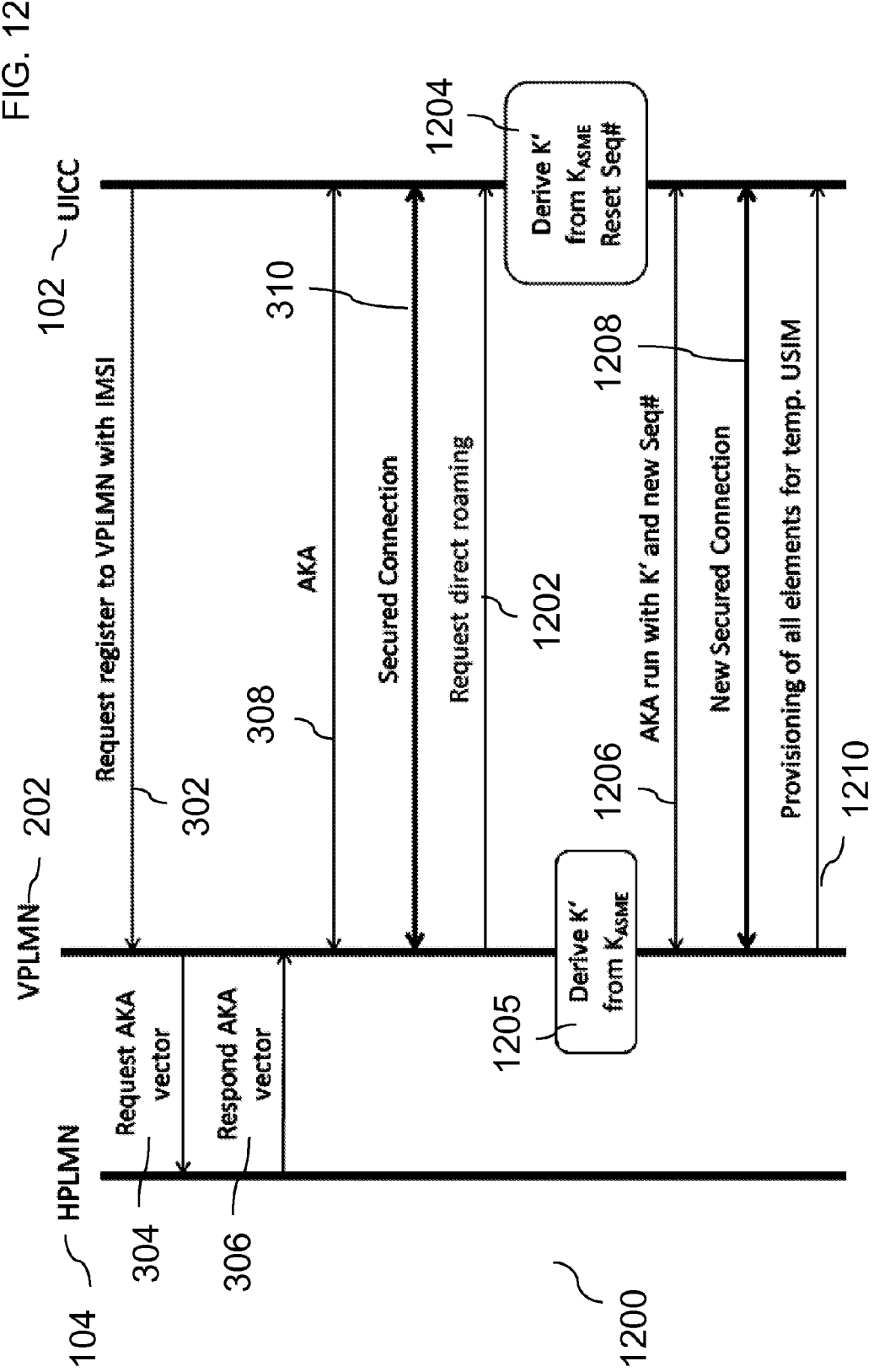
FIG. 12 shows a message flow diagram according to various aspects of this disclosure.

FIG. 12 shows a message flow diagram according to various aspects of this disclosure.

A roaming connection established directly between the mobile station 102 and the visited network 202 may be accomplished even after legacy roaming has occurred, as shown in FIG. 12.

In FIG. 12, a roaming connection between the mobile station 102 and the visited network 202 may be established through the home network by legacy roaming, described above in respect of FIG. 3 and messages 302, 304, 306, 308, 310.

The visited network 202 may provide a request for roaming (by means of message 1202) to the mobile device 102. As in the case of FIG. 11 where the memory 404, the key-generator 406, the vector-generator 410 and the authenticator 412 may be arranged in the visited network 202, the key generator included in the visited network 202 may derive the second encryption key, K', (1204) from a first encryption key after the visited network 202 has provided the request for roaming (by means of message 1202) to the mobile station 102. Accordingly, the visited network may be configured to provide the request for roaming to the mobile station. Additionally, the key-generator included in the visited network may be configured to derive the second encryption key from the first encryption key (1205) after the visited network has provided the request for roaming to the mobile station.

Simultaneously, the mobile station 102 may receive the request for roaming (by means of message 1202) from the visited network 202. As in the case of FIG. 7 where the memory 404, the key-generator 406, the vector-generator 410 and the authenticator 412 may be arranged in the mobile station 102, the key generator included in the mobile station 102 may derive the second encryption key, K', (1204) from a first encryption key after the mobile station 102 has received the request for roaming (by means of message 1202) from the visited network 202. Accordingly, the mobile station may be configured to receive the request for roaming from the visited network, and the key-generator included in the mobile station may be configured to derive the second encryption key from the first encryption key after the mobile station has received the request for roaming from the visited network.

Consequently, when each of the mobile station 102 and the visited network 202 has the second encryption key, K', the mobile station 102 may establish a roaming connection with the visited network 202 directly, and not through the home network 104. The further features described above with reference to messages 818, 820, and 822 of FIG. 8 are equally application and hereby restated, in respect of messages 1206, 1208, 1210 of FIG. 12, wherein a roaming connection between the visited network 202 and the mobile station 102 is established directly, and not through the home network 104.

Accordingly, in the message flow diagram of FIG. 12, direct roaming between the visited network 202 and the mobile station 102 may be accomplished through the request for roaming (by means of message 1202).

Figure 13:
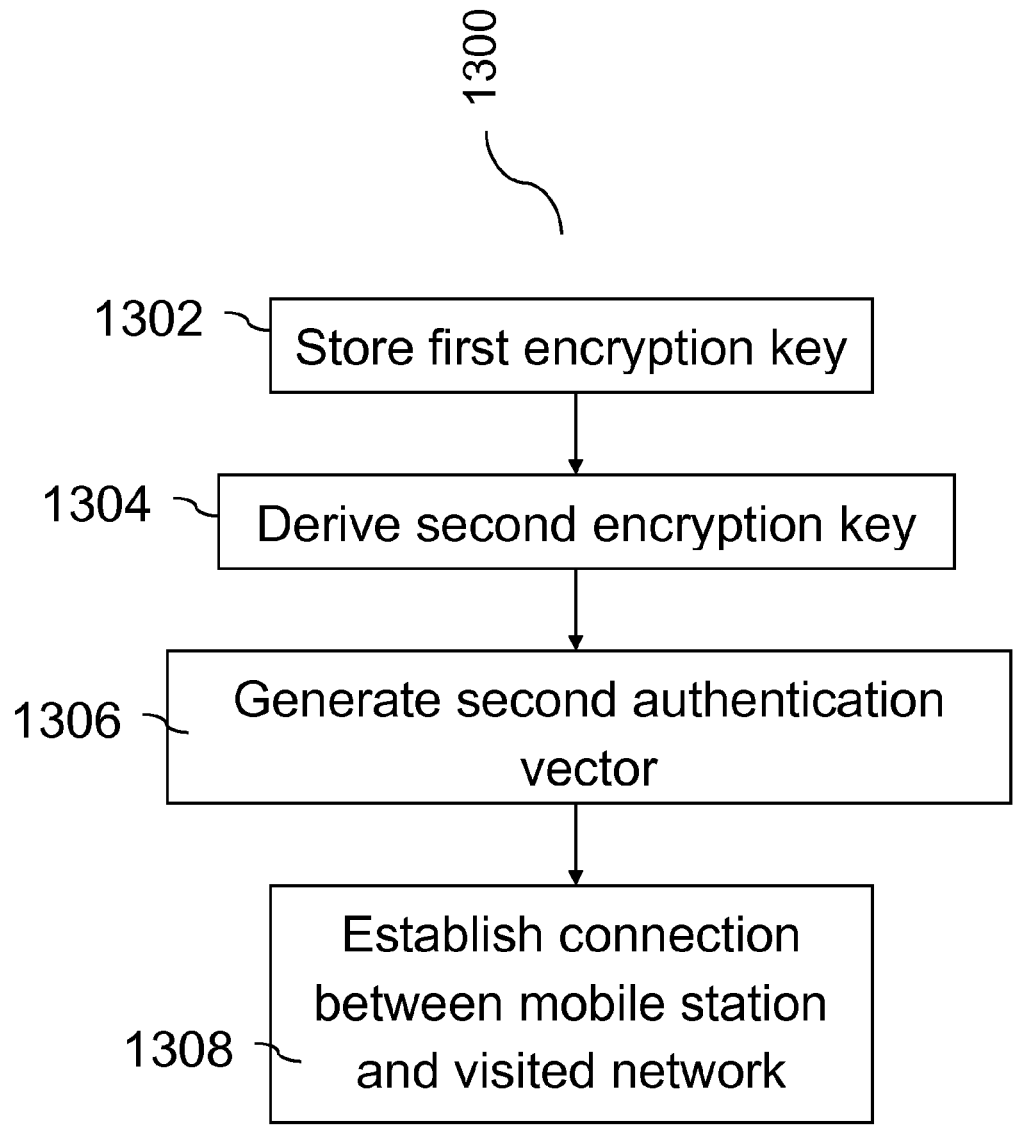
FIG. 13 shows a method for roaming between a visited network and a mobile station according to various aspects of this disclosure.

FIG. 13 shows a method for roaming between a visited network and a mobile station according to various aspects of this disclosure.

According to various aspects of this disclosure, a method for roaming between a visited network and a mobile station is provided. The method 1300 may include: storing a first encryption key (in 1302). The first encryption key may be suitable for generating a first authentication vector for authentication between the mobile station 102 and a home network 104. The method 1300 may include deriving a second encryption key (in 1304). The second encryption key may be derived from the first encryption key. Further, the second encryption key may be suitable for generating a second authentication vector for authentication between the mobile station 102 and the visited network 202.

The method 1300 may further include generating the second authentication vector (in 1304) from the second encryption key, and establishing a connection between the mobile station and the visited network (in 1308) with the second authentication vector.

The further features described above with reference to storing the first encryption key, deriving the second encryption key, generating the second authentication vector, and establishing a connection between the mobile station and the visited network for the circuit arrangement are equally applicable, and hereby restated, in respect of the method 1300.

Figure 14:
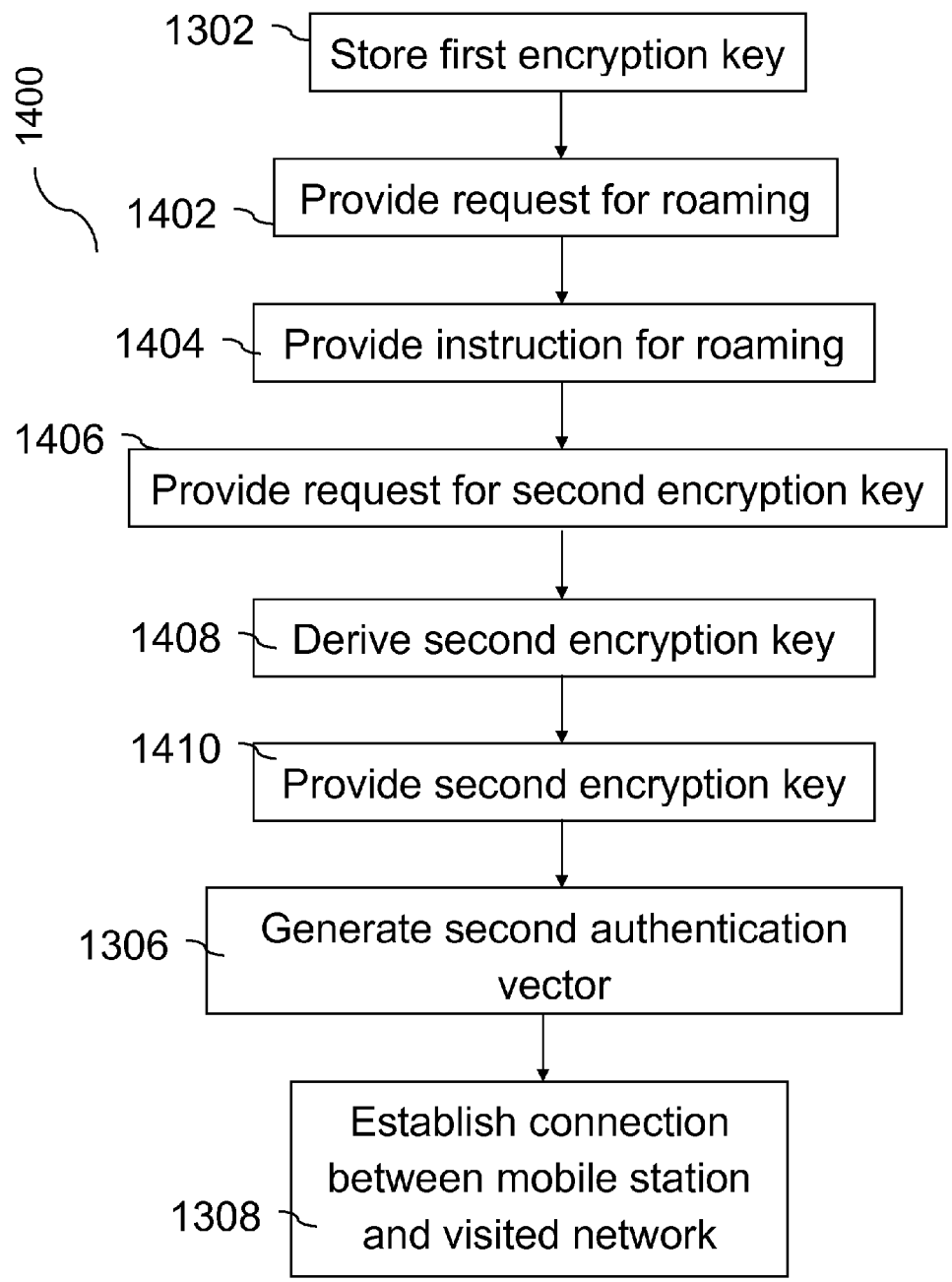
FIG. 14 shows a method for roaming between a visited network and a mobile station according to various aspects of this disclosure.

FIG. 14 shows a method for roaming between a visited network and a mobile station according to various aspects of this disclosure.

Various aspects of this disclosure provide a method for roaming between a visited network and a mobile station. The method 1400 may include: storing a first encryption key (in 1302). The first encryption key may be suitable for generating a first authentication vector for authentication between the mobile station 102 and a home network 104.

The method 1400 may include providing a request for roaming (in 1402) from the mobile station to the home network. The request for roaming may include a request for connectivity between the visited network and the mobile station. The further features described above with reference to providing the request for roaming in the circuit arrangement (by means of message 604) are equally applicable, and hereby restated, in respect of providing the request for roaming in method 1400.

The method 1400 may include providing an instruction for roaming from the home network to each of the visited network and the mobile station. The instruction for roaming may include an instruction to establish connectivity between the visited network and the mobile station. The further features described above with reference to providing the instructions for roaming in the circuit arrangement (by means of messages 606 and 608) are equally applicable, and hereby restated, in respect of providing the instruction for roaming in method 1400.

The method 1400 may further include providing a request for the second encryption key (in 1406) from the visited network to the home network. The further features described above with reference to providing the request for the second encryption key in the circuit arrangement (by means of message 610) are equally applicable, and hereby restated, in respect of providing the request for the second encryption key in method 1400.

The method 1400 may further include deriving the second encryption key (in 1408) from the first encryption key in response to the request for the second encryption key. The further features described above with reference to deriving the second encryption key in the circuit arrangement (612) are equally applicable, and hereby restated, in respect of deriving the second encryption key in method 1400.

The method 1400 may further include providing the second encryption key (in 1410) from the home network to the visited network. The further features described above with reference to providing the second encryption key in the circuit arrangement (by means of message 614) are equally applicable, and hereby restated, in respect of providing the second encryption key in method 1400.

After providing the second encryption key to the visited network, the method 1400 may include generating the second authentication vector (in 1306) using the second encryption key, and establishing roaming (in 1308) between the mobile station and the visited network.

Figure 15:
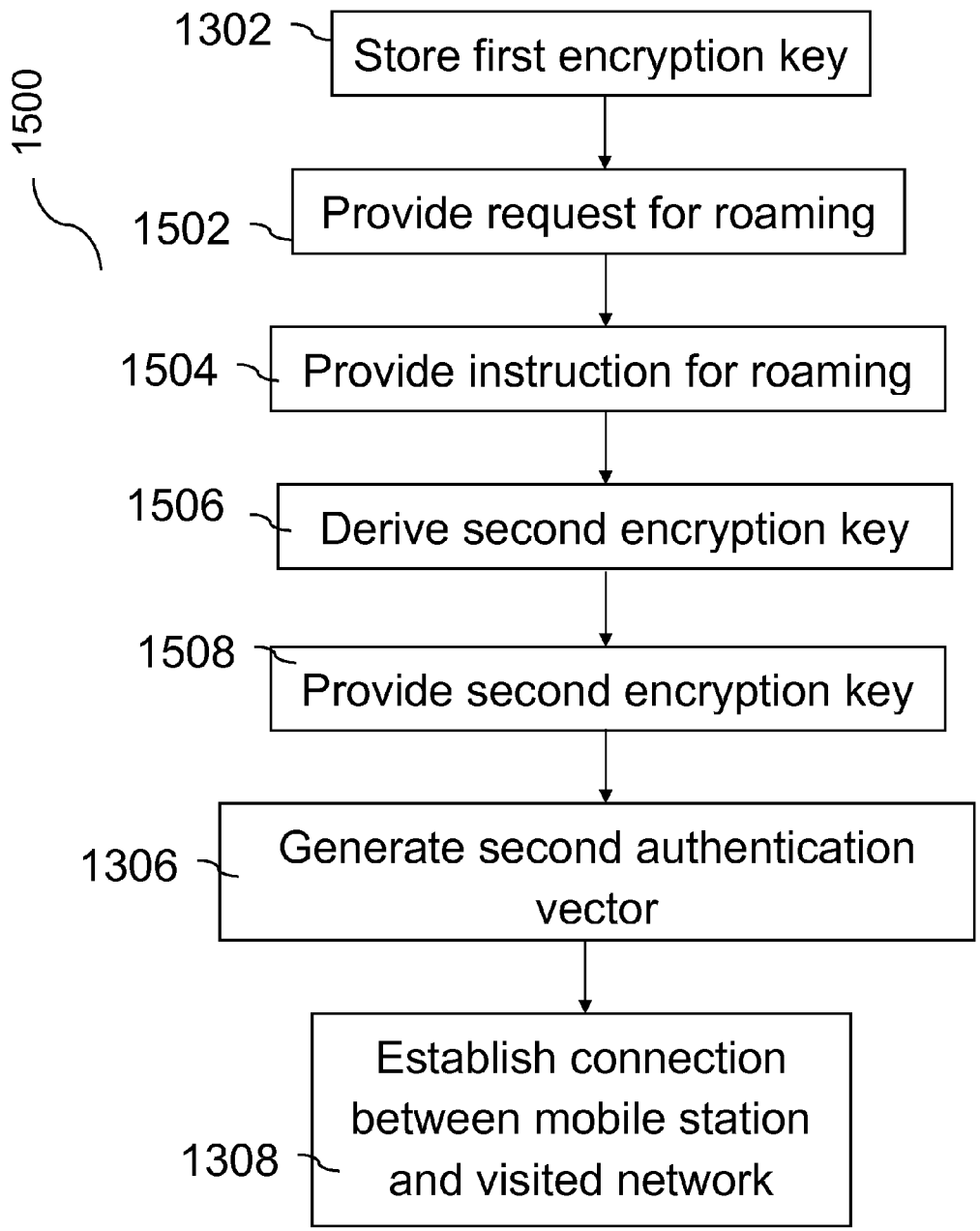
FIG. 15 shows a method for roaming between a visited network and a mobile station according to various aspects of this disclosure.

FIG. 15 shows a method for roaming between a visited network and a mobile station according to various aspects of this disclosure.

Various aspects of this disclosure provide a method for roaming between a visited network and a mobile station. The method 1500 may include: storing a first encryption key (in 1302). The first encryption key may be suitable for generating a first authentication vector for authentication between the mobile station 102 and a home network 104.

The method 1500 may include providing the request for roaming (in 1502) from the mobile station to the visited network. The further features described above with reference to providing the request for roaming in the circuit arrangement (by means of message 806) are equally applicable, and hereby restated, in respect of providing the request for roaming in method 1500.

The method 1500 may include providing the instruction for roaming (in 1504) from the visited network to the home network. The further features described above with reference to providing the instruction for roaming in the circuit arrangement (by means of message 810) are equally applicable, and hereby restated, in respect of providing the instruction for roaming in method 1500.

The method 1500 may include deriving the second encryption key (in 1506) from the first encryption key in response to the instruction for roaming. The further features described above with reference to deriving the second encryption key in the circuit arrangement (812) are equally applicable, and hereby restated, in respect of deriving the second encryption key in method 1500.

The method 1500 may include providing the second encryption key (in 1508) from the home network to the visited network. The further features described above with reference to providing the second encryption key in the circuit arrangement (by means of message 814) are equally applicable, and hereby restated, in respect of providing the second encryption key in method 1500.

After providing the second encryption key to the visited network, the method 1500 may include generating the second authentication vector (in 1306) using the second encryption key, and establishing roaming (in 1308) between the mobile station and the visited network.

Figure 16:
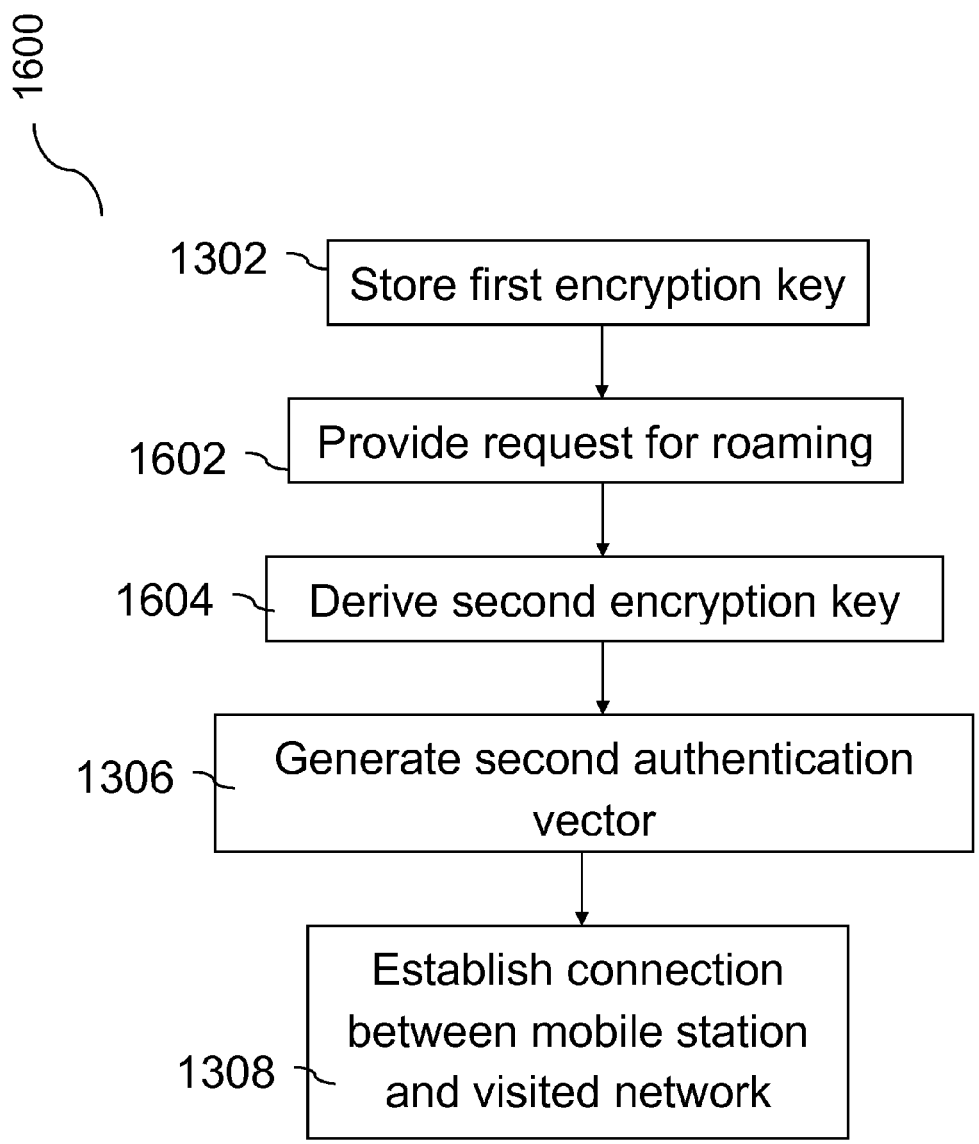
FIG. 16 shows a method for roaming between a visited network and a mobile station according to various aspects of this disclosure.

FIG. 16 shows a method for roaming between a visited network and a mobile station according to various aspects of this disclosure.

Various aspects of this disclosure provide a method for roaming between a visited network and a mobile station. The method 1600 may include: storing a first encryption key (in 1302). The first encryption key may be suitable for generating a first authentication vector for authentication between the mobile station 102 and a home network 104.

The method 1600 may include providing the request for roaming (in 1602) from the mobile station to the visited network. The further features described above with reference to providing the request for roaming in the circuit arrangement (by means of message 1102) are equally applicable, and hereby restated, in respect of providing the request for roaming in method 1600.

The method 1600 may include deriving the second encryption key (in 1604) from the first encryption key in response to the request for roaming. The further features described above with reference to deriving the second encryption key in the circuit arrangement (1104 and 1106) are equally applicable, and hereby restated, in respect of deriving the second encryption key in method 1600.

After deriving the second encryption key, the method 1600 may include generating the second authentication vector (in 1306) using the second encryption key, and establishing roaming (in 1308) between the mobile station and the visited network.

Figure 17:
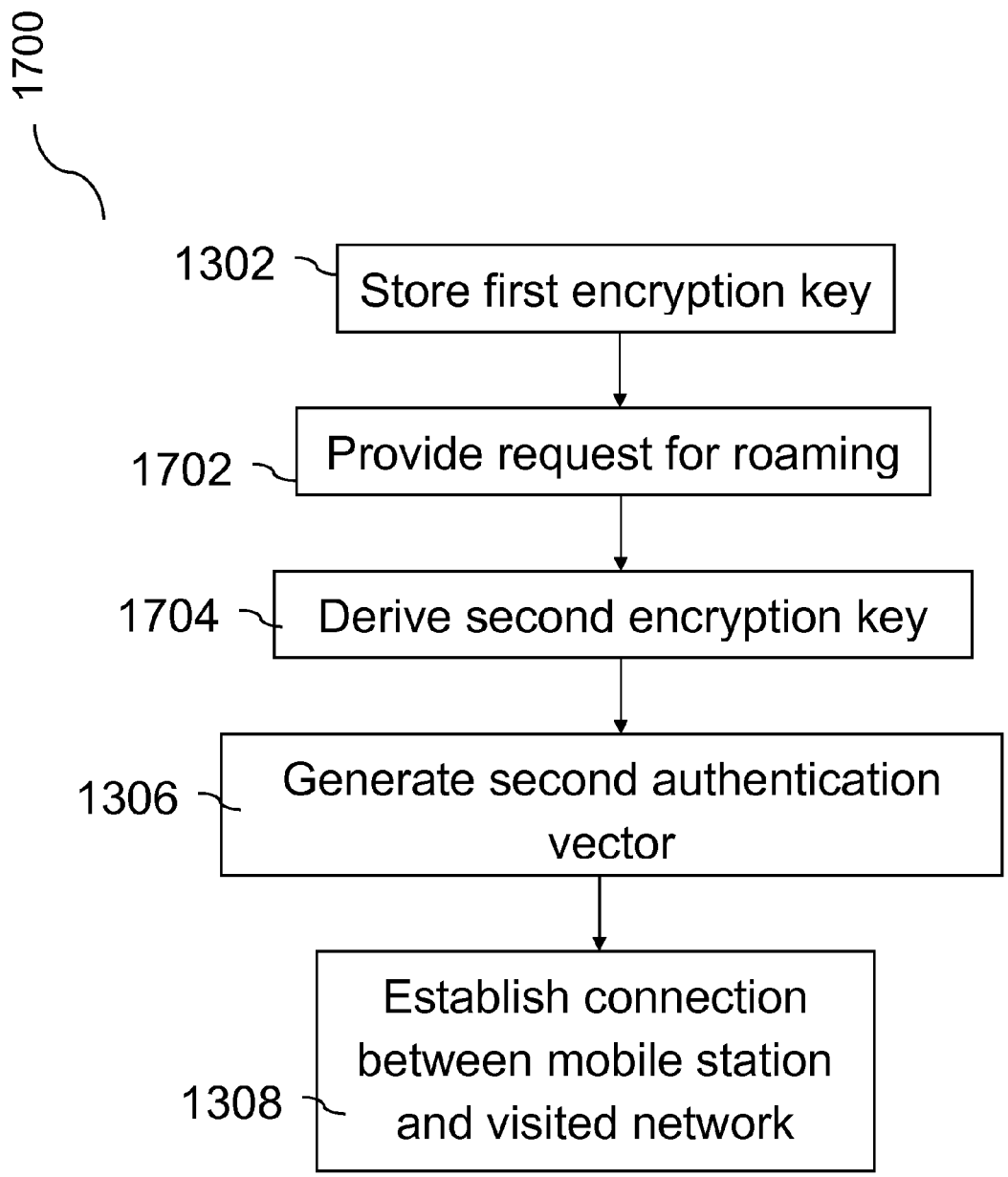
FIG. 17 shows a method for roaming between a visited network and a mobile station according to various aspects of this disclosure.

FIG. 17 shows a method for roaming between a visited network and a mobile station according to various aspects of this disclosure.

Various aspects of this disclosure provide a method for roaming between a visited network and a mobile station. The method 1700 may include: storing a first encryption key (in 1302). The first encryption key may be suitable for generating a first authentication vector for authentication between the mobile station 102 and a home network 104.

The method 1700 may include providing the request for roaming (in 1702) to the mobile station from the visited network. The further features described above with reference to providing the request for roaming in the circuit arrangement (by means of message 1202) are equally applicable, and hereby restated, in respect of providing the request for roaming in method 1700.

The method 1700 may include deriving the second encryption key (in 1704) from the first encryption key in response to the request for roaming. The first encryption key may be an encryption key stored in the visited network 202, such as, for example, hierarchical keys generated between entities in LTE. The further features described above with reference to deriving the second encryption key in the circuit arrangement (1204 and 1205) are equally applicable, and hereby restated, in respect of deriving the second encryption key in method 1700.

After deriving the second encryption key, the method 1700 may include generating the second authentication vector (in 1306) using the second encryption key, and establishing roaming (in 1308) between the mobile station and the visited network.

Figure 18:
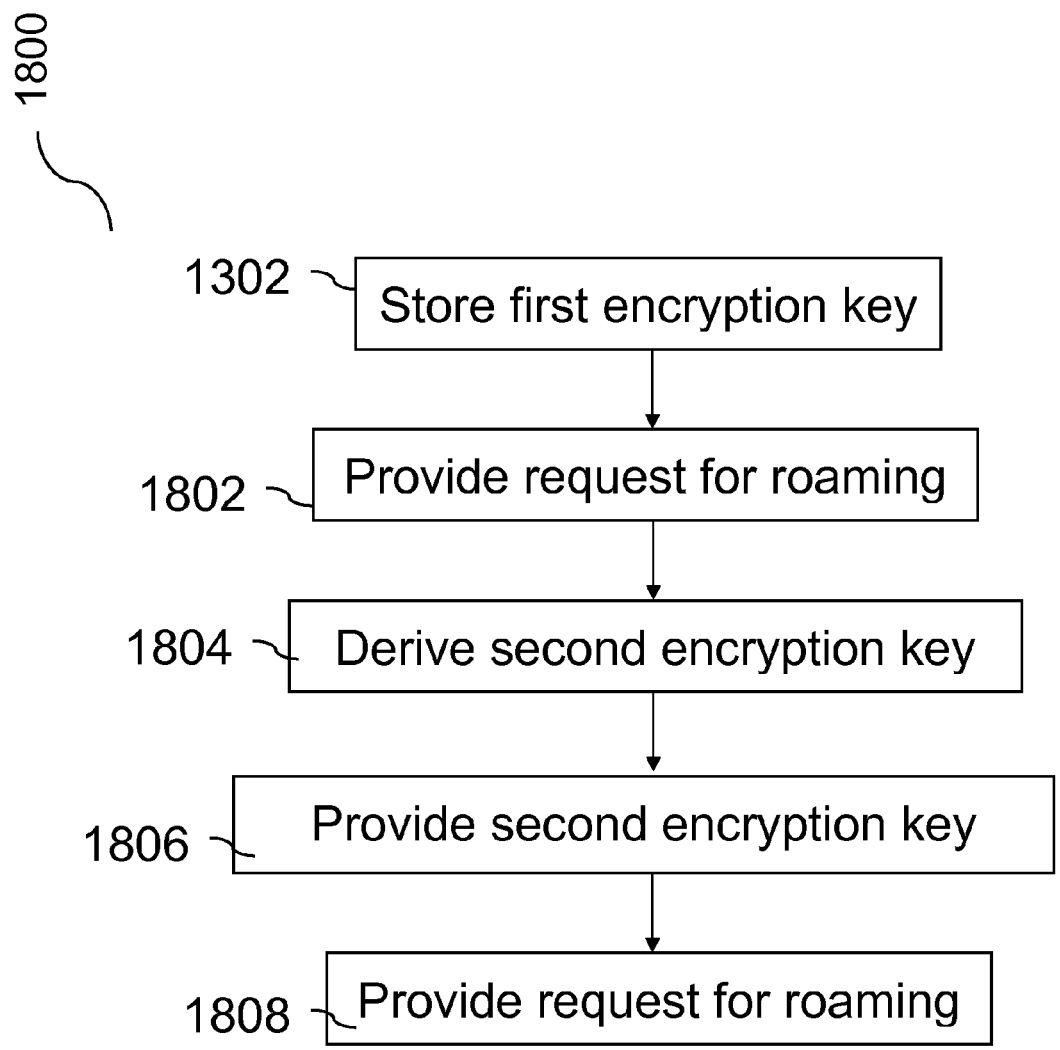
FIG. 18 shows a method for roaming between a visited network and a mobile station according to various aspects of this disclosure.

FIG. 18 shows a method for roaming between a visited network and a mobile station according to various aspects of this disclosure.

Various aspects of this disclosure provide a method for roaming between a visited network and a mobile station. The method 1800 may include: storing a first encryption key (in 1302). The first encryption key may be suitable for generating a first authentication vector for authentication between the mobile station 102 and a home network 104.

The method 1800 may include providing the request for roaming (in 1802) from the visited network to the home network. The further features described above with reference to providing the request for roaming in the circuit arrangement (by means of message 902) are equally applicable, and hereby restated, in respect of providing the request for roaming in method 1800.

The method 1800 may include deriving the second encryption key (in 1804) from the first encryption key in response to the request for roaming. The further features described above with reference to deriving the second encryption key in the circuit arrangement (904) are equally applicable, and hereby restated, in respect of deriving the second encryption key in method 1800.

The method 1800 may include providing the second encryption key (in 1806) from the home network to the visited network. The further features described above with reference to providing the second encryption key in the circuit arrangement (by means of message 906) are equally applicable, and hereby restated, in respect of providing the second encryption key in method 1800.

The method 1800 may include providing the request for roaming (in 1808) from the visited network to the mobile station. The further features described above with reference to providing the second encryption key in the circuit arrangement (by means of message 908) are equally applicable, and hereby restated, in respect of providing the request for roaming in method 1800.

While various aspects of this disclosure have been particularly shown and described with reference to these aspects of this disclosure, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A circuit arrangement employed by a home network, comprising:
    a memory configured to store a first encryption key, wherein the home network is to generate a first authentication vector, using the first encryption key, for authentication between a mobile station and the home network of the mobile station; and
    a key-generator configured to:
        receive a request for a second encryption key from a visited network;
        derive, in response to the request, the second encryption key from a combination of the first encryption key and a mobile country code (MCC) or a mobile network code (MNC) of the home network or the visited network,
        provide the second encryption key to the visited network from the home network in an encapsulated message, wherein a challenge-response scheme is used to establish a direct roaming connection between the mobile station and the visited network, wherein, as part of the challenge response scheme:
            the visited network is to generate a second authentication vector, based on the second encryption key, received from the home network, and a random number received from the mobile station in a registration request,
            the mobile station is to generate the second encryption key, generate an authentication vector, based on the second encryption key and the random number, and send the authentication vector to the visited network; and
            the visited network is to compare the second authentication vector with the authentication vector received from the mobile station for authentication and establishment of the direct roaming connection between the mobile station and the visited network when the second authentication vector and the authentication vector received from the mobile station are identical.

2. The circuit arrangement according to claim 1, wherein an authenticator of the visited network is to establish a connection between the mobile station and the visited network with the second authentication vector.

3. The circuit arrangement according to claim 2, wherein the authenticator is configured to establish the connection between the mobile station and the visited network with the second authentication vector using an authentication and key agreement (AKA) protocol.

4. The circuit arrangement according to claim 1, wherein the home network is configured to provide an international mobile subscriber identity of the mobile station to the visited network.

5. The circuit arrangement according to claim 1, wherein the circuit arrangement is configured to receive a request for roaming from the mobile station, the request for roaming comprising a request for connectivity between the visited network and the mobile station.

6. The circuit arrangement according to claim 5, wherein the request for roaming further comprises a data field indicating the visited network preferred by the mobile station.

7. The circuit arrangement according to claim 1, wherein the circuit arrangement is configured to provide an instruction for roaming to the visited network and to the mobile station, the instruction for roaming comprising an instruction to establish connectivity between the visited network and the mobile station.

8. The circuit arrangement according to claim 1, wherein the circuit arrangement is to receive an instruction for roaming from the visited network, wherein the request for the second encryption key is included in the instruction for roaming.

9. The circuit arrangement according to claim 1, wherein the circuit arrangement is to receive a request for roaming from the visited network, wherein the request for the second encryption key is included in the request for roaming.

10. A circuit arrangement employed by a visited network, the circuit arrangement comprising:
    a memory;
    a vector-generator to:
        receive, in response to a request sent from the visited network to a home network and a mobile station roamed to the visited network, a second encryption key from the home network that is derived from a combination of a first encryption key and a mobile country code (MCC) or a mobile network code (MNC) of the home network or the visited network, the first encryption key used by the home network to generate a first authentication vector for authentication between the mobile station and the home network, wherein the mobile station is to also generate the second encryption key; and use a challenge-response scheme to establish a direct roaming connection between the mobile station and the visited network, wherein as part of the challenge-response scheme, the visited network is to:
   receive a random number from the mobile station in a registration request; and
   generate a second authentication vector based on the second encryption key and the random number; and
an authenticator coupled to the vector-generator, the authenticator to:
   receive a third authentication vector from the mobile station wherein the third authentication vector is generated, based on the second encryption key and the random number;
   compare the second authentication vector with the third authentication vector received from the mobile station for authentication; and
   establish the direct roaming connection between the mobile station and the visited network when the second authentication vector is identical to the third authentication vector.

11. The circuit arrangement according to claim 10, wherein the circuit arrangement is configured to receive a request for roaming from the mobile station, and wherein the key-generator is configured to derive the second encryption key from the first encryption key after the circuit arrangement has received the request for roaming from the mobile station.

12. The circuit arrangement according to claim 10, wherein the circuit arrangement is configured to provide a request for roaming to the mobile station.

13. The circuit arrangement according to claim 12, wherein the key-generator is configured to derive the second encryption key from the first encryption key after the circuit arrangement has provided the request for roaming to the mobile station.

14. The circuit arrangement of claim 10, wherein the random number is included in a request for registration received from the mobile station.

15. A method employed by a home network to enable roaming between a visited network and a mobile station, the method comprising:
   storing a first encryption key;
   generating a first authentication vector for authentication between the mobile station and the home network using the first encryption key;
   receiving a request for a second encryption key from the visited network; deriving, responsive to the request, the second encryption key from a combination of the first encryption key and a mobile country code (MCC) or mobile network code (MNC) of the home network or a visited network, wherein the mobile station is to also generate the second encryption key;
   transmitting the second encryption key to the visited network from the home network in an encapsulated message; and
   performing a challenge-response scheme to establish a direct roaming connection between the mobile station and the visited network, wherein performing the challenge-response scheme includes:
      generating, by the visited network based on the second encryption key and a random number generated by the mobile station or the visited network, a second authentication vector;
      wherein the mobile station is to generate an authentication vector, based on the second encryption key and the random number, and send the authentication vector to the visited network;
      and wherein the visited network is to compare the second authentication vector with the authentication vector received from the mobile station for authentication and establishment of the direct roaming connection between the mobile station and the visited network when the second authentication vector and the authentication vector received from the mobile station are identical.

16. The method according to claim 15, further comprising:
receiving a request for roaming from the mobile station, the request for roaming comprising a request for connectivity between the visited network and the mobile station;
providing an instruction for roaming to the visited network and to the mobile station, the instruction for roaming comprising an instruction to establish connectivity between the visited network and the mobile station;
deriving the second encryption key from the first encryption key in response to the request for the second encryption key; and
providing the second encryption key to the visited network.

17. The method according to claim 15, further comprising:
receiving an instruction for roaming from the visited network, the instruction for roaming including the request for the second encryption key.

18. The method according to claim 15, further comprising:
receiving a request for roaming from the visited network, the request for roaming including the request for the second encryption key.

* * * * *